United States Patent
Yamagata et al.

(10) Patent No.: US 9,507,123 B2
(45) Date of Patent: Nov. 29, 2016

(54) IMAGING APPARATUS

(71) Applicant: Panasonic Intellectual Property Management Co., Ltd., Osaka (JP)

(72) Inventors: Michihiro Yamagata, Osaka (JP); Norihiro Imamura, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/664,041

(22) Filed: Mar. 20, 2015

(65) Prior Publication Data

US 2015/0192758 A1 Jul. 9, 2015

Related U.S. Application Data

(63) Continuation of application No. PCT/JP2014/003550, filed on Jul. 3, 2014.

(30) Foreign Application Priority Data

Jul. 12, 2013 (JP) .................... 2013-146423

(51) Int. Cl.
*H04N 5/359* (2011.01)
*G02B 13/00* (2006.01)
(Continued)

(52) U.S. Cl.
CPC ......... *G02B 13/0015* (2013.01); *G02B 5/3025* (2013.01); *H04N 5/2254* (2013.01); *H04N 5/359* (2013.01)

(58) Field of Classification Search
CPC ............ G02B 13/0015; G02B 5/3025; H04N 5/359; H04N 5/2254; H04N 5/357; H04N 5/3572
USPC ........................................................ 348/368
See application file for complete search history.

(56) References Cited

U.S. PATENT DOCUMENTS 6,707,955 B1 3/2004 Shiomi
8,345,144 B1* 1/2013 Georgiev ............... G03B 11/00
348/335

(Continued)

FOREIGN PATENT DOCUMENTS

JP 10-271519 10/1998
JP 2001-016509 1/2001

(Continued)

OTHER PUBLICATIONS

International Search Report of PCT application No. PCT/JP2014/003550 dated Oct. 7, 2014.

*Primary Examiner* — Albert Cutler
(74) *Attorney, Agent, or Firm* — Renner, Otto, Boisselle & Sklar, LLP

(57) ABSTRACT

An imaging apparatus according to one aspect of the present disclosure includes an optical system, an image sensor, an optical element array which is positioned between the optical system and the image sensor, a memory that stores a group of coefficients configured with a matrix of n rows and n columns in which elements are expressed by $R_{ik}$ (i and k being integers that satisfy $1 \leq i \leq n$ and $1 \leq k \leq n$), and a processor that receives the group of coefficients from the memory and calculates n converted pixel signals $x'_1, x'_2, \ldots, x'_n$ from n pixel signals $x_1, x_2, \ldots, x_n$ by the following equation.

$$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R_{n,n} \end{pmatrix} \begin{pmatrix} x_1 \\ x_2 \\ \vdots \\ x_n \end{pmatrix}$$

20 Claims, 8 Drawing Sheets

(51) Int. Cl.
*G02B 5/30* (2006.01)
*H04N 5/225* (2006.01)

(56) References Cited

U.S. PATENT DOCUMENTS

| | | | |
|---|---|---|---|
| 2009/0027542 A1* | 1/2009 | Yamamoto | H04N 5/2254 348/340 |
| 2010/0277626 A1 | 11/2010 | Yoshino | |
| 2011/0134288 A1 | 6/2011 | Kasai | |
| 2012/0091551 A1* | 4/2012 | Marenco | H01L 27/14625 257/432 |
| 2012/0206635 A1 | 8/2012 | Kikuchi et al. | |
| 2012/0268643 A1 | 10/2012 | Imamura | |
| 2013/0032694 A1 | 2/2013 | Nakata | |
| 2013/0083233 A1* | 4/2013 | Fukami | H04N 5/3572 348/360 |
| 2015/0009369 A1* | 1/2015 | Ono | G03B 15/00 348/248 |

FOREIGN PATENT DOCUMENTS

| | | |
|---|---|---|
| JP | 2003-523646 | 8/2003 |
| JP | 2010-288093 | 12/2010 |
| JP | 2011-521591 | 7/2011 |
| JP | 2012-169830 | 9/2012 |
| JP | 2013-034086 | 2/2013 |
| WO | 00/50927 | 8/2000 |
| WO | 2009/093588 | 7/2009 |
| WO | 2009/142641 | 11/2009 |
| WO | 2011/001738 | 1/2011 |
| WO | 2012/143983 | 10/2012 |

* cited by examiner

FIG. 12

| α | β | γ |
|---|---|---|
| β | δ | ε |
| γ | ε | ζ |

FIG. 13

| θ | η | θ |
|---|---|---|
| ι | κ | ι |
| λ | μ | λ |

FIG. 14

| ο | ξ | ο |
|---|---|---|
| ξ | ν | ξ |
| ο | ξ | ο |

# IMAGING APPARATUS

BACKGROUND

1. Technical Field

The present disclosure relates to an imaging apparatus such as a camera.

2. Description of the Related Art

It has been desirable to develop an imaging apparatus that captures an image of the same object under multiple optical conditions having different wavelength bands, polarization conditions, exposure conditions, and so forth of light used for image capturing. Japanese Patent No. 5001471 discloses an imaging apparatus in which the stop of an optical system is divided, filters under different optical conditions are arranged in the divided stop, and an optical element array such as a micro-lens array is arranged in front of an image sensor. The imaging apparatus guides beams of incident light from different optical areas of the stop to respective pixels by using a light beam separation effect based on the optical element array and thereby obtains images under multiple optical conditions with one shot.

SUMMARY

In the above-described related art, it has been desired to further enhance the quality of images obtained under plural optical conditions. One non-limiting and exemplary embodiment provides an imaging apparatus that enables a high-quality image to be obtained in accordance with desired plural optical conditions.

In one general aspect, the techniques disclosed here feature an imaging apparatus including: an optical system that has n optical areas (n being an integer of 2 or greater) that are arranged approximately orthogonally to an optical axis; an image sensor that has plural groups formed of n pixels and converts light incident on the pixels into pixel signals by photoelectric conversion; an optical element array which is positioned between the optical system and the image sensor and in which plural optical components are arranged and the optical components cause light that passes through the n optical areas to be incident on the n pixels in the group that correspond to the optical areas; a memory that stores a group of coefficients configured with a matrix of n rows and n columns in which elements are expressed by $R_{ik}$ (i and k being integers that satisfy $1 \leq i \leq n$ and $1 \leq k \leq n$); and a processor that receives the group of coefficients from the memory and calculates n converted pixel signals $x'_1, x'_2, \ldots, x'_n$ from n pixel signals $x_1, x_2, \ldots, x_n$ obtained from each of the groups of the image sensor by the following equation.

$$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R_{n,n} \end{pmatrix} \begin{pmatrix} x_1 \\ x_2 \\ \vdots \\ x_n \end{pmatrix}$$

An imaging apparatus disclosed in the present disclosure enables a high-quality image to be obtained in accordance with desired plural optical conditions.

It should be noted that general and specific embodiments may be implemented as a system, a device, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a diagram illustrating one example of a situation of the crosstalk in the imaging apparatus according to the third embodiment;

FIG. 13 is a diagram illustrating another example of a situation of the crosstalk in the imaging apparatus according to the third embodiment;

FIG. 14 is a diagram illustrating still another example of a situation of the crosstalk in the imaging apparatus according to the third embodiment;

Figure 1:
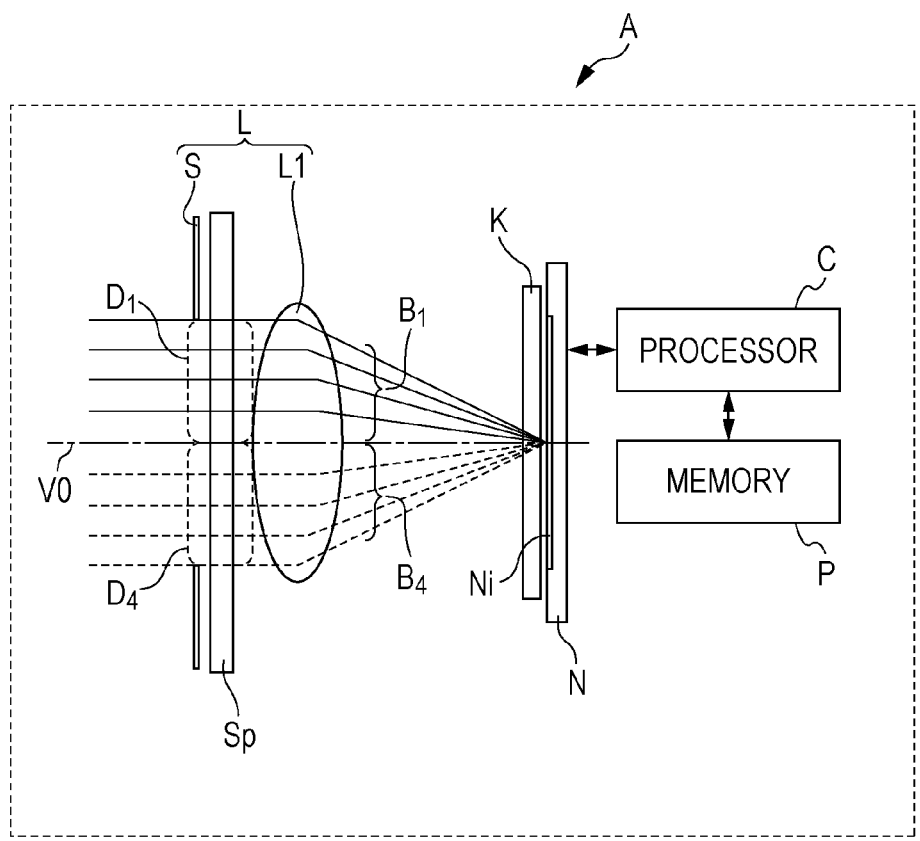
FIG. 1 is a schematic diagram illustrating an imaging apparatus of a first embodiment.

DETAILED DESCRIPTION (Underlying Knowledge Forming Basis of Present Disclosure)

In an imaging apparatus disclosed in Japanese Patent No. 5001471, light beams that pass through a divided stop are separated by an optical element array and guided to different pixels. In a detailed study, the inventor of the present disclosure found that the optical element array did not always completely separate the light beam, and there was a case where light spilled onto pixels different from those on which the light beam was supposed to be incident. This phenomenon is referred to as crosstalk. When such crosstalk occurs, it becomes difficult to obtain an image under optical conditions designated to optical filters of a stop, and thus it becomes difficult to obtain a high-quality image under a desired optical condition.

Such crosstalk increases as the size of the imaging apparatus and the pixel pitch of an image sensor decrease, the light behaves in a less geometrical-optical manner and a more diffractive manner.

In order to reduce the crosstalk, light-shielding areas may be provided on boundary portions of the optical areas to divide the stop into plural optical areas, and a light beam in a vicinity of the boundary of the divided optical areas may thereby be prevented from being incident on an unintended pixel. However, in this case, a light intensity of light incident on the pixel decreases, and the sensitivity of the imaging apparatus is possibly decreased.

Accordingly, the inventor of the present disclosure conceived a novel imaging apparatus that enables a high-quality image to be obtained in accordance with desired plural optical conditions.

An imaging apparatus according to one aspect of the present disclosure is an imaging apparatus including: an optical system that has n optical areas (n being an integer of 2 or greater) arranged approximately orthogonally to an optical axis; an image sensor that has plural groups formed of n pixels and converts light incident on the pixels into pixel signals by photoelectric conversion; an optical element array which is positioned between the optical system and the image sensor and in which plural optical components are arranged, and the optical components cause light that passes through the n optical areas to be incident on the n pixels in the group that correspond to the optical areas; a memory that stores a group of coefficients configured with a matrix of n rows and n columns in which elements are expressed by $R_{ik}$ (i and k being integers that satisfy $1 \leq i \leq n$ and $1 \leq k \leq n$); and a processor that receives the group of coefficients from the memory and calculates n converted pixel signals $x'_1, x'_2, \ldots, x'_n$ from n pixel signals $x_1, x_2, \ldots, x_n$ obtained from each of the groups of the image sensor by the following equation.

$$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R_{n,n} \end{pmatrix} \begin{pmatrix} x_1 \\ x_2 \\ \vdots \\ x_n \end{pmatrix}$$

The processor may generate n image signals from the converted pixel signals $x'_1, x'_2, \ldots, x'_n$ of each of the groups.

The optical element array may be a micro-lens array and may be integrally formed on the image sensor.

It is not necessary to provide a color filter between the optical element array and a photoelectric conversion area of the image sensor.

At least one of the n optical areas may be different from the other optical areas in at least one selected from the group consisting of a polarization characteristic of the light that passes through the optical area, a spectral wavelength characteristic of the light that passes through the optical area, a transmittance of the light that passes through the optical area, and an area in a plane that is orthogonal to the optical axis of the optical areas.

The integer n may satisfy a relationship of $n = m \times m$ (m being an integer of 2 or greater).

The n pixels may be arranged in m rows and m columns in a horizontal direction and in a vertical direction, respectively, in each of the groups of the image sensor, and the optical components of the optical element array may cause light that passes through the n optical areas to be incident on the pixels arranged in the m rows and the m columns.

The integer n may be 4, the integer m may be 2, and the group of coefficients may be the following matrix configured with four numbers $\epsilon$, $\eta$, $\theta$, and $\lambda$ that satisfy the following conditions.

$\epsilon > 1$,
$\theta < 0$,
$\eta < 0$,
$\epsilon > \lambda$,
$\lambda > \theta$, and
$\lambda > \eta$.

$$G_m^{-1} = \begin{pmatrix} \varepsilon & \eta & \theta & \lambda \\ \eta & \varepsilon & \lambda & \theta \\ \theta & \lambda & \varepsilon & \eta \\ \lambda & \theta & \eta & \varepsilon \end{pmatrix}$$

The integer n may be 4, the integer m may be 2, and the group of coefficients may be the following matrix configured with three numbers $\epsilon$, $\eta$, and $\lambda$ that satisfy the following conditions.

$\epsilon > \lambda > \eta$,
$\epsilon > 1$, and
$\eta < 0$.

$$G_s^{-1} = \begin{pmatrix} \varepsilon & \eta & \eta & \lambda \\ \eta & \varepsilon & \lambda & \eta \\ \eta & \lambda & \varepsilon & \eta \\ \lambda & \eta & \eta & \varepsilon \end{pmatrix}$$

The number $\epsilon$ may satisfy a relationship of $1 < \epsilon < 2$.

The number $\lambda$ may satisfy a relationship of $-0.3 < \lambda < 0$.

Differences among the intensities of light incident on the n pixels may be less than 2% in each of the groups of the image sensor.

The integer n may be 4.

Given that a proportion in which a light beam that passes through any one of the n optical areas is caused to be incident on a normal pixel in a design by the corresponding optical component of the optical element array in each of the groups of the image sensor is $\alpha$ %, a proportion in which the light beam is caused to be incident on a neighboring pixel is $\beta$ %, and a proportion in which the light beam is caused to be incident on an obliquely neighboring pixel is $\delta$ %, $\alpha$, $\beta$, and $\delta$ may satisfy relationships of $\alpha > \beta > \delta$, and
$\beta < 25\%$.

The numbers $\alpha$ and $\beta$ may satisfy a relationship of $\alpha > 4\beta$.

The number $\alpha$ may satisfy a relationship of $97\% > \alpha > 45\%$.

The number $\alpha$ may satisfy a relationship of $85\% > \alpha > 65\%$.

The number $\beta$ may be approximately twice as great as $\delta$.

The imaging apparatus may further include a light-shielding member that causes light to pass through one optical area among the n optical areas of the optical system and shields the other optical areas from light. The processor may capture an image of an object by using the light-shielding member to calculate the group of coefficients from the n pixel signals $x_1, x_2, \ldots, x_n$ obtained from each of the groups of the image sensor or to calculate the group of coefficients from the n image signals, and the memory may store the calculated group of coefficients.

The light-shielding member is capable of changing the optical area that causes light to pass through, and the processor may perform plural image captures while changing the optical area that causes light to pass through and the processor can calculate the group of coefficients for the plural image captures.

The imaging apparatus may further include a data input device that inputs at least some of the coefficient values of the group of coefficients.

The processor may calculate crosstalk amounts due to the optical components and calculate a matrix that expresses the calculated crosstalk amounts and an inverse matrix of the matrix, and the memory may store the inverse matrix as the group of coefficients.

The integer n may be 4, and all elements of the matrix that express the crosstalk amounts may be configured with four values in the processor.

The integer n may be 4, and all elements of the matrix that express the crosstalk amounts may be configured with three values in the processor.

Diagonal components $R_{ii}$ (i being an integer that satisfies $1 \le i \le n$) of the matrix that configures the group of coefficients may satisfy a relationship of $1 < R_{ii} < 2.3$.

Diagonal components $R_{ii}$ (i being an integer that satisfies $1 \le i \le n$) of the matrix that configures the group of coefficients may satisfy a relationship of $1 < R_{ii} < 1.053$.

Japanese Patent No. 4120020, International Publication No. 2011/001738, and Japanese Unexamined Patent Application Publication No. 2012-169830 propose various methods for reducing and measuring crosstalk in color signal processing of an image sensor that has a color filter. In a color filter used for a common color image sensor, because the wavelength bands of the light that passes through the color filter are widened to overlap each other in order to increase sensitivity, color signals are restored by a prescribed computation method. During correction of the crosstalk among colors, signal processing is performed so that the colors of an obtained color image have values that more accurately represent an object.

Further, Japanese Unexamined Patent Application Publication No. 2013-34086 proposes a method for monitoring the amount of light that spills onto peripheral pixels by providing a shield over a prescribed pixel for measurement of the crosstalk. International Publication No. 2009/093588 proposes a method for calculating a correction matrix by capturing images of plural color charts with different spectral characteristics.

In the technical field of color signal processing of color image sensors, many methods for reducing the crosstalk have been proposed. However, such methods involve correction based on color information. That is, it is assumed that the color filter is integrally formed on the image sensor. On the contrary, known methods may not be applicable to an imaging apparatus of a divided stop type that will be described in the following embodiments because plural optical conditions do not always entail different wavelength bands and may entaile wavelength bands such as those of infrared rays or ultraviolet rays that are different from so-called RGB bands, even if images are captured while the wavelength bands are changing.

Further, the crosstalk in those image sensors is caused by leakage of electric charges from neighboring pixels. Thus, correction of the crosstalk is, in principle, performed for each pixel in consideration of the influence of neighboring pixels.

In addition, in a case where a pixel for a leaking light measurement is provided on the image sensor, the output value of the pixel is interpolated from the peripheral pixels. In many cases, an image generated by such a method be beneficial for appreciating a photograph. However, determining the output value of a pixel not measured by interpolation of the peripheral pixels is not preferable for the imaging apparatus whose main object is image measurement. Thus, it is preferable that the pixel for the measurement of the spilled light not be arranged on the image sensor in the imaging apparatus of the present disclosure.

(First Embodiment)

FIG. 1 is a schematic diagram illustrating a first embodiment of the imaging apparatus of the present disclosure. An imaging apparatus A of this embodiment includes an optical lens system L with an optical axis V0, an optical element array K arranged in a vicinity of a focal point of the optical lens system L, an image sensor N, a processor C, and a memory P.

The optical lens system L contains a diaphragm S and an object lens L1 that forms an image on the image sensor N with light that passes through the diaphragm S. The optical lens system L has n optical areas arranged in a non-parallel manner with the optical axis V0 in a vicinity of the diaphragm S. Here, the number n is an integer that is two or greater. At least one of the n optical areas is different from the other optical areas in at least one selected from the group consisting of the polarization characteristic of light that passes through the optical area, the spectral wavelength characteristic of the light that passes through the optical area, the transmittance of the light that passes through the optical area, and the area in a plane that is generally orthogonal to the optical axis V0 of the optical areas.

In this embodiment, the optical lens system L has optical areas $D_1$, $D_2$, $D_3$, and $D_4$ in a vicinity of the diaphragm S. An area divided polarizer Sp is arranged in the optical areas $D_1$ to $D_4$ such that at least one of the optical areas $D_1$ to $D_4$ has a different polarization characteristic from the other optical areas.

Figure 2:
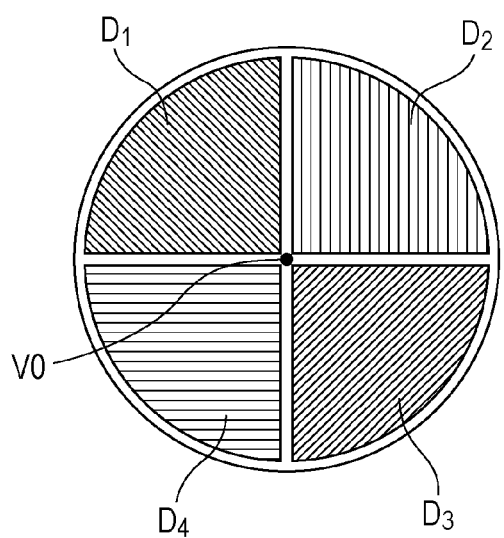
FIG. 2 is a front view of an area divided polarizer of the first embodiment.

FIG. 2 illustrates a front view of the area divided polarizer Sp as seen from the object side. The optical areas are divided into the four optical areas $D_1$, $D_2$, $D_3$, and $D_4$ with the optical axis V0 as a center, and polarization directions of light that passes through the respective areas are different from each other. The optical areas $D_1$, $D_2$, $D_3$, and $D_4$ are arrayed in the horizontal direction and the vertical direction in the plane orthogonal to the optical axis V0.

In FIG. 1, light beams $B_1$, $B_2$ (not illustrated), $B_3$ (not illustrated), and $B_4$ are light beams that pass through the optical areas $D_1$, $D_2$ (not illustrated), $D_3$ (not illustrated), and $D_4$, respectively.

The light beams $B_1$, $B_2$ (not illustrated), $B_3$ (not illustrated), and $B_4$ pass through the diaphragm S, the area divided polarizer Sp, the object lens L1, and the optical element array K in this order and arrive at an image-capturing surface Ni on the image sensor N.

Figure 3:
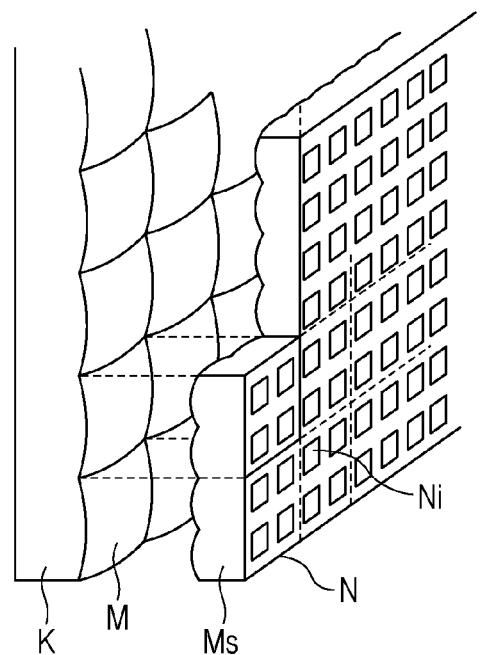
FIG. 3 is an enlarged view of an optical element array and an image sensor.

FIG. 3 is an enlarged view of the optical element array K and the image sensor N illustrated in FIG. 1. The image sensor N has plural groups formed of n pixels and converts light incident on the pixels into pixel signals (pixel values) by photoelectric conversion. No color filter is provided on the n pixels of the image sensor N, that is, between the image sensor N and the optical element array K.

The optical element array K is positioned between the optical lens system L and the image sensor N and includes plural arrayed optical components.

The optical components cause light beams that pass through the n optical areas to be incident on the respective n pixels of the corresponding group of the image sensor N.

In this embodiment, the optical element array K is a micro-lens array having micro-lenses M as the optical components. As illustrated in FIG. 3, the optical element array K is arranged with a surface on which the micro-lenses M are disposed to face the side of the image sensor N. As illustrated in FIG. 1, the optical element array K is disposed in the vicinity of the focal point of optical lens system L and is disposed at a position separated from the image sensor N by a prescribed distance. Micro-lenses Ms cover the surfaces of the pixels on the image-capturing surface Ni. The arrangement of the optical element array K may be determined by using a focal point of the object lens L1 as a reference. Further, the period of micro-lens surfaces of the optical element array K is a period that corresponding to two pixels in each of the longitudinal direction and the lateral direction with respect to the pixels formed on the image-capturing surface Ni.

Figure 4:
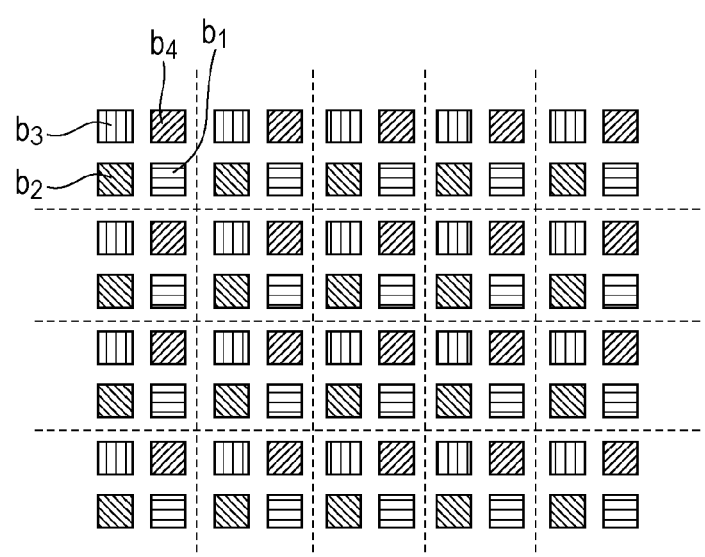
FIG. 4 is a diagram illustrating an incident situation of light beam on the image sensor.

As illustrated in FIG. 3, the single micro-lens M is arranged to correspond to pixels in two rows and two columns among the n pixels on the image-capturing surface Ni. The micro-lens M has a function of allocating emission directions in accordance with the incident angle of the light beam. As illustrated in FIG. 4, the micro-lens M, which is one of the optical components, causes light to be incident on pixels $b_1$, $b_2$, $b_3$, and $b_4$ that configure one group. In each of the groups, large portions of light beams that pass through the optical areas $D_1$, $D_2$, $D_3$, and $D_4$ are incident on the pixels $b_1$, $b_2$, $b_3$, and $b_4$, respectively. As illustrated in FIGS. 2 and 4, the micro-lens M has an optical axis parallel to the optical axis V0, and the light beams that pass through the optical areas $D_1$, $D_2$, $D_3$, and $D_4$ are incident on the pixels $b_1$, $b_2$, $b_3$, and $b_4$ symmetrically to the optical axis of the micro-lens M. That is, the light beam that passes through the optical area $D_1$ is incident on the pixel $b_1$, the light beam that passes through the optical area $D_2$ is incident on the pixel $b_2$, the light beam that passes through the optical area $D_3$ is incident on the pixel $b_3$, and the light beam that passes through the optical area $D_4$ is incident on the pixel $b_4$.

In the whole image sensor N, with the left upper portion in FIG. 4 as a reference, the pixels $b_1$, $b_2$, $b_3$, and $b_4$ are arranged such that a large portion of the light beam $B_1$ that passes through the optical area $D_1$ is incident on the pixel $b_1$ positioned in an even row and an even column among the pixels on the image-capturing surface Ni, a large portion of the light beam $B_2$ (not illustrated) that passes through the optical area $D_2$ is incident on the pixel $b_2$ positioned in an even row and an odd column among the pixels on the image-capturing surface Ni, a large portion of the light beam $B_3$ (not illustrated) that passes through the optical area $D_3$ is incident on the pixel $b_3$ positioned in an odd row and an odd column among the pixels on the image-capturing surface Ni, and a large portion of the light beam $B_4$ that passes through the optical area $D_4$ is incident on the pixel $b_4$ positioned in an odd row and an even column among the pixels on the image-capturing surface Ni. In order to realize this, the refractive index of the optical element array, the radius of curvature of the micro-lens M, the distance from the image-capturing surface Ni, and so forth may appropriately be adjusted.

The micro-lenses M of the optical element array K ideally cause the light beams $B_1$, $B_2$ (not illustrated), $B_3$ (not illustrated), and $B_4$ that pass through the optical areas $D_1$, $D_2$, $D_3$, and $D_4$ of the optical lens system L to be incident only on the respective pixels $b_1$, $b_2$, $b_3$, and $b_4$ of each of the groups of the image sensor N. However, as described above, in each of the groups, the light beams $B_1$, $B_2$ (not illustrated), $B_3$ (not illustrated), and $B_4$ are actually incident on neighboring pixels of the corresponding pixels. That is, crosstalk occurs.

The image sensor N converts light incident on each of the pixels of each of the groups into pixel signals by photoelectric conversion. In each of the groups, the respective pixels $b_1$, $b_2$, $b_3$, and $b_4$ ideally detect only the light beams $B_1$, $B_2$ (not illustrated), $B_3$ (not illustrated), and $B_4$ that pass through the optical areas $D_1$, $D_2$, $D_3$, and $D_4$. However, because crosstalk occurs as described above, the pixel signals obtained from the pixels $b_1$, $b_2$, $b_3$, and $b_4$ do not correctly reflect the corresponding light beams. Thus, the imaging apparatus of this embodiment corrects the pixel signals to reduce the influence of crosstalk caused by the processor C.

Thus, the memory P stores a group of coefficients configured as a matrix in which elements that correspond to crosstalk amounts are expressed by $R_{ik}$ (i and k are integers that satisfy $0 \leq i \leq n$ and $0 \leq k \leq n$) and formed of n rows and n columns.

The processor C receives the group of coefficients from the memory P and calculates converted pixel signals $x'_1$, $x'_2$, ..., $x'_n$ by the following equation from n pixel signals $x_1, x_2, \ldots, x_n$ obtained from each of the groups of the image sensor. This computation will be described in detail below.

$$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R_{n,n} \end{pmatrix} \begin{pmatrix} x_1 \\ x_2 \\ \vdots \\ x_n \end{pmatrix}$$

In addition, the processor C generates n image signals from the converted pixel signals $x'_1, x'_2, \ldots, x'_n$ of each of the groups. In this embodiment, the processor C generates four image signals. Specifically, the processor C extracts the converted pixel signals obtained from the pixels $b_1$, $b_2$, $b_3$, and $b_4$ of each of the groups and generates image signals $Q_1$, $Q_2$, $Q_3$, and $Q_4$. More specifically, the processor C generates the image signal $Q_1$ from the pixel signal obtained from the pixel $b_1$ of each of the groups. Similarly, the processor C generates the image signals $Q_2$, $Q_3$, and $Q_4$ from the pixel signals obtained from the pixels $b_2$, $b_3$, and $b_4$ of each of the groups. The image signals $Q_1$, $Q_2$, $Q_3$, and $Q_4$ obtained from this process are images generated from the light beams that pass mainly through the respective optical areas $D_1$, $D_2$, $D_3$, and $D_4$.

Figure 5:
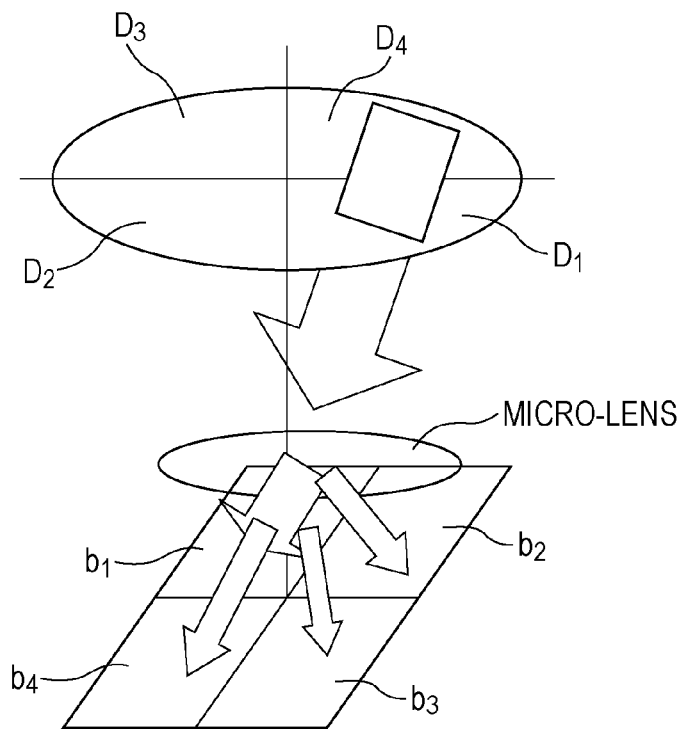
FIG. 5 is a diagram illustrating crosstalk.

The crosstalk in each of the groups of the image sensor is now described. FIG. 5 is a schematic diagram illustrating crosstalk. For simplicity, FIG. 5 selectively illustrates the micro-lens M that is one of the optical components which configure the micro-lens array of the optical element array K and four pixels that correspond to the optical component and which configure one group. FIG. 5 does not illustrate the optical lens system L and so forth. A large portion of the light beam that passes through the optical area $D_1$ in FIG. 5 is incident on the pixel $b_1$ on the image-capturing surface Ni due to an effect of the micro-lens. However, as the element becomes smaller a propagating component of light energy in a different direction from geometrical-optical behavior is produced, and the light beam becomes incident on the pixels $b_2$, $b_3$, and $b_4$. The incident components on the pixels $b_2$, $b_3$, and $b_4$ are light resulting from crosstalk. Such crosstalk light is similarly produced from the light beams that pass through the optical areas $D_2$, $D_3$, and $D_4$.

Thus, incident light intensities measured in the pixels $b_1$, $b_2$, $b_3$, and $b_4$ contain the crosstalk light from the other optical areas in addition to normal light beams from the optical areas that correspond to the four optical areas $D_1$, $D_2$, $D_3$, and $D_4$ in a design.

Here, it is assumed that the ratio of light incident on the normal pixel in the design to the light beam that passes through the optical area $D_1$ is $\alpha_1\%$, the ratio of light incident on the pixel adjacent to the normal pixel in the design in the left-right direction is $\beta_1\%$, the ratio of light incident on the pixel adjacent to the normal pixel in the design in the up-down direction is $\gamma_1\%$, and the ratio of light incident on the pixel adjacent to the normal pixel in the design in an oblique direction is $\delta_1\%$. In an example illustrated in FIG. 5, the normal pixel in the design is the pixel $b_1$, the pixel adjacent to the normal pixel in the design in the left-right direction is the pixel $b_2$, the pixel adjacent to the normal pixel in the design in the up-down direction is the pixel $b_3$, and the pixel adjacent to the normal pixel in the design in an oblique direction is the pixel $b_4$. In a case where optical loss due to other factors may be ignored, $\alpha_1+\beta_1+\gamma_1+\delta_1=100\%$.

With respect to the optical area $D_2$, it is assumed that the ratio of light incident on the normal pixel in the design is $\alpha_2\%$, the ratio of light incident on the pixel adjacent to the normal pixel in the design in the left-right direction is $\beta_2\%$, the ratio of light incident on the pixel adjacent to the normal pixel in the design in the up-down direction is $\gamma_2\%$, and the ratio of light incident on the pixel adjacent to the normal pixel in the design in an oblique direction is $\delta_2\%$.

Similarly, with respect to the optical area $D_3$, it is assumed that the ratios of light that are incident on the normal pixel in the design, on the pixel adjacent to the normal pixel in the design in the left-right direction, on the pixel adjacent to the normal pixel in the design in the up-down direction, and on the pixel adjacent to the normal pixel in the design in an oblique direction are $\alpha_3$, $\beta_3$, $\gamma_3$, and $\delta_3$, respectively. Further, with respect to the optical area $D_4$, it is assumed that the ratios of light that are incident on the normal pixel in the design, on the pixel adjacent to the normal pixel in the design in the left-right direction, on the pixel adjacent to the normal pixel in the design in the up-down direction, and on the pixel adjacent to the normal pixel in the design in an oblique direction are $\alpha_4$, $\beta_4$, $\gamma_4$, and $\delta_4$, respectively.

It is assumed that the intensities of light that passes through the optical areas $D_1$, $D_2$, $D_3$, and $D_4$ among light that arrives at the micro-lens that corresponds to the pixels $b_1$, $b_2$, $b_3$, and $b_4$ are $x'_1$, $x'_2$, $x'_3$, and $x'_4$, respectively. In this case, given that the amount of light measured in the pixel $b_1$ is $x_1$, $$x_1 = \alpha_1 x'_1 + \beta_2 x'_2 + \gamma_3 x'_3 + \delta_4 x'_4.$$

Given that the amounts of light that are measured in the pixels $b_2$, $b_3$, and $b_4$ are $x_2$, $x_3$, and $x_4$, those are similar to the above and expressed by a matrix as follows:

$$\begin{pmatrix} x_1 \\ x_2 \\ x_3 \\ x_4 \end{pmatrix} = \begin{bmatrix} \alpha_1 & \beta_2 & \gamma_3 & \delta_4 \\ \beta_1 & \alpha_2 & \delta_3 & \gamma_4 \\ \gamma_1 & \delta_2 & \alpha_3 & \beta_4 \\ \delta_1 & \gamma_2 & \beta_3 & \alpha_4 \end{bmatrix} \begin{pmatrix} x'_1 \\ x'_2 \\ x'_3 \\ x'_4 \end{pmatrix}$$

Here, $$G = \begin{bmatrix} \alpha_1 & \beta_2 & \gamma_3 & \delta_4 \\ \beta_1 & \alpha_2 & \delta_3 & \gamma_4 \\ \gamma_1 & \delta_2 & \alpha_3 & \beta_4 \\ \delta_1 & \gamma_2 & \beta_3 & \alpha_4 \end{bmatrix}$$

In this case, matrix G is a matrix that expresses the crosstalk amounts of the micro-lens array that is the optical element array K for separating light beams arranged in front of the image sensor N. Further, matrix G is based on the crosstalk amounts that are produced in one of the optical components of the optical element array K. Inverse matrix $G^{-1}$ of matrix G that expresses the crosstalk is used, and the intensities $x'_1$, $x'_2$, $x'_3$, and $x'_4$ of light that passes through the optical areas $D_1$, $D_2$, $D_3$, and $D_4$ and arrives at the concerned one micro-lens in the optical element array K may thereby be obtained as follows:

$$\begin{pmatrix} x'_1 \\ x'_2 \\ x'_3 \\ x'_4 \end{pmatrix} = G^{-1} \begin{pmatrix} x_1 \\ x_2 \\ x_3 \\ x_4 \end{pmatrix}$$

A group of coefficients of 16 (4×4) coefficients that form above inverse matrix $G^{-1}$ is stored in the memory P, and the processor C performs above-described computation for each of the pixel signals that are obtained from the pixels $b_1$, $b_2$, $b_3$, and $b_4$ of each of the groups of the image sensor. That is, the crosstalk is not taken into consideration among the groups of the image sensor. The imaging apparatus of this embodiment is different in this point from related art that performs correction for leakage of electric charges from the neighboring pixels.

This provides the image signals $Q_1$, $Q_2$, $Q_3$, and $Q_4$ with a reduced influence of the crosstalk. In this embodiment, the area divided polarizer Sp in which directions of polarization axes are different from each other is arranged in the optical areas $D_1$, $D_2$, $D_3$, and $D_4$. Thus, the image signals $Q_1$, $Q_2$, $Q_3$, and $Q_4$ configure respective images $G_1$, $G_2$, $G_3$, and $G_4$ that are images of the same object captured at a same time from almost same angles. However, light that is incident from the object is polarized light, and the directions of the polarization axes are different. In this embodiment, the crosstalk among the images $G_1$, $G_2$, $G_3$, and $G_4$ is reduced in the images $G_1$, $G_2$, $G_3$, and $G_4$. That is, the image $G_1$ contains almost no components of the images of $G_2$, $G_3$, and $G_4$. This applies to the other images $G_2$, $G_3$, and $G_4$, similarly. Thus, the degrees of polarization in the images $G_1$, $G_2$, $G_3$, and $G_4$ are high.

In the imaging apparatus of this embodiment, the crosstalk amounts do not change unless the incident angle of light that is incident on the optical element array K changes. Thus, in a case where optical characteristics of the optical lens system L are specified, and the focal point, the size of a lens pupil, and so forth do not change in the imaging apparatus A, calculation of above-described inverse matrix $G^{-1}$ may be performed once. For example, in a case where inverse matrix $G^{-1}$ is calculated before the imaging apparatus A is shipped as a product or when a user starts using the imaging apparatus A, the crosstalk may be reduced by using the same inverse matrix $G^{-1}$ in each image capturing.

On the other hand, in a case where at least one selected the group consisting of the optical characteristics of the optical lens system L, the focal point, and the size of the lens pupil changes, the crosstalk may more certainly be reduced by obtaining matrix G and inverse matrix $G^{-1}$ at each change. In a case where matrix G and inverse matrix $G^{-1}$ are frequently obtained, a configuration described in a second embodiment may be used.

In this embodiment, processes are conducted in the order of application of signal processing that reduces the influence of the crosstalk to the pixel signals and then generation of the image signal from the pixel signals to which the signal processing is applied. However, the order may be reversed. The image signal may first be generated from the pixel signals, and the signal processing that reduces the influence of the crosstalk may next be performed.

Further, it is not necessary to perform both of the signal processing that reduces the influence of the crosstalk and signal processing for generating the image signal from the pixel signals in the processor C. Either one or both of the processing may be performed by an external processor such as a personal computer.

Examples of computation for reducing the crosstalk will be described below with specific values.

EXAMPLE 1

In a case where the ratio of light incident on the normal pixel in the design is approximately 80±2%, the proportion of the crosstalk to a lateral pixel of the normal pixel in the design is approximately 6±2%, the proportion of the crosstalk to a higher or lower pixel of the normal pixel in the design is approximately 6±2%, and the proportion of the crosstalk to a pixel on the diagonal side of the normal pixel in the design is approximately 4±2%, one example of matrix G that expresses the crosstalk amounts is as follows:

$$G = \begin{pmatrix} 0.80526 & 0.07393 & 0.08195 & 0.06040 \\ 0.06110 & 0.78779 & 0.05168 & 0.06298 \\ 0.08049 & 0.07349 & 0.80921 & 0.07526 \\ 0.05315 & 0.06479 & 0.05717 & 0.80137 \end{pmatrix}$$

Inverse matrix $G^{-1}$ of matrix G is as follows:

$$G^{-1} = \begin{pmatrix} 1.2663477 & -0.1016906 & -0.1163397 & -0.0765123 \\ -0.0853537 & 1.29097219 & -0.0675234 & -0.0886846 \\ -0.111778 & -0.0986989 & 1.26062432 & -0.1022068 \\ -0.069103 & -0.0905827 & -0.0767522 & 1.26740346 \end{pmatrix}$$

Inverse matrix $G^{-1}$ as the coefficients is in advance stored in the memory P, matrix computation is performed by reading out inverse matrix $G^{-1}$ from the memory P, and the crosstalk may thereby be corrected.

EXAMPLE 2

In a case where the ratio of light incident on the normal pixel in the design is approximately 63±3%, the proportion of the crosstalk to the lateral pixel of the normal pixel in the design is approximately 15±2%, the proportion of the crosstalk to the higher or lower pixel of the normal pixel in the design is approximately 15±2%, and the proportion of the crosstalk to the pixel on the diagonal side of the normal pixel in the design is approximately 7±2%, one example of matrix G that expresses the crosstalk amounts is as follows:

$$G = \begin{pmatrix} 0.60925 & 0.16961 & 0.15649 & 0.07400 \\ 0.16252 & 0.62639 & 0.05138 & 015429 \\ 0.15465 & 0.05444 & 0.62627 & 0.14663 \\ 0.07359 & 0.14956 & 0.16586 & 0.62508 \end{pmatrix}$$

Inverse matrix $G^{-1}$ of matrix G is as follows:

$$G^{-1} = \begin{pmatrix} 1.87610058 & -0.469388 & -0.4287803 & -0.005664 \\ -0.451927 & 1.81048185 & 0.07311349 & -0.4105319 \\ -0.04239229 & 0.05012216 & 1.80039289 & -0.3845051 \\ -0.0002507 & -0.391216 & -0.4447261 & 1.8007098 \end{pmatrix}$$

Inverse matrix $G^{-1}$ as the coefficients is in advance stored in the memory, matrix computation is performed by reading out inverse matrix $G^{-1}$ from the memory P, and the crosstalk may thereby be corrected.

In the above Example, because photoelectric conversion areas may not necessarily be arranged symmetrically with respect to the center position of the micro-lens due to an influence of arrangement of circuit wiring of the image sensor or the like, the 16 coefficients are used on an assumption that the crosstalk amount differs in accordance with a location. However, in a case where it may be supposed that the differences among the proportions of the crosstalk light due to differences in an opening position are sufficiently small and the crosstalk in the pixels $b_1$, $b_2$, $b_3$, and $b_4$ are equal among each of the groups of the image sensor, the following equations hold true. In this case, the matrix that expresses the crosstalk amounts may be simplified.

$\alpha_1 \approx \alpha_2 \approx \alpha_3 \approx \alpha_4$
$\beta_1 \approx \beta_2 \approx \beta_3 \approx \beta_4$
$\gamma_1 \approx \gamma_2 \approx \gamma_3 \approx \gamma_4$
$\delta_1 \approx \delta_2 \approx \delta_3 \approx \delta_4$ In this case, given that a representative value of $\alpha_1$, $\alpha_2$, $\alpha_3$, and $\alpha_4$, a representative value of $\beta_1$, $\beta_2$, $\beta_3$, and $\beta_4$, a representative value of $\gamma_1$, $\gamma_2$, $\gamma_3$, and $\gamma_4$, and a representative value of $\delta_1$, $\delta_2$, $\delta_3$, and $\delta_4$ are $\alpha$, $\beta$, $\gamma$, and $\delta$, respectively, matrix G that expresses the above-described crosstalk amounts may be expressed by $G_m$ expressed by the four values. An example of the representative value is an average value.

$$G_m = \begin{pmatrix} \alpha & \beta & \gamma & \delta \\ \beta & \alpha & \delta & \gamma \\ \gamma & \delta & \alpha & \beta \\ \delta & \gamma & \beta & \alpha \end{pmatrix}$$

Inverse matrix $G_m^{-1}$ of matrix $G_m$ is as follows:

$$G_m^{-1} = \begin{pmatrix} \varepsilon & \eta & \theta & \lambda \\ \eta & \varepsilon & \lambda & \theta \\ \theta & \lambda & \varepsilon & \eta \\ \lambda & \theta & \eta & \varepsilon \end{pmatrix}$$

In this case, the number of storage areas necessary in the memory P in the imaging apparatus may be reduced to four, and simplification of the memory may thus be expected.

Here, $\alpha$, $\beta$, $\gamma$, and $\delta$ satisfy either one of $\alpha>\beta>\gamma>\delta\geq0$ and $\alpha>\gamma>\beta>\delta\geq0$. If $\alpha>\beta>\gamma>\delta$, $\epsilon>\lambda>\theta>\eta$ holds. If $\alpha>\gamma>\beta>\delta$, $\epsilon>\lambda>\eta>0$ holds.

Further, $\epsilon>1$ is a condition for a to satisfy the above relationships. In other words, $\epsilon>1$ is a condition that is necessary for a large portion of a light beam that passes through a prescribed opening to be incident on a desired pixel in a design.

Such approximation may be used in a case where the differences among $\alpha_1$, $\alpha_2$, $\alpha_3$, and $\alpha_4$, the differences among $\beta_1$, $\beta_2$, $\beta_3$, and $\beta_4$, the differences among $\gamma_1$, $\gamma_2$, $\gamma_3$, and $\gamma_4$, and the differences among $\delta_1$, $\delta_2$, $\delta_3$, and $\delta_4$ are lower than approximately 2% and may be used in a case where the differences are lower than 1%.

In a case where $\beta\approx\gamma\approx\delta$ and $\alpha$ is below 60%, $\lambda\leq-0.3$ holds and a crosstalk light intensity to the pixel on the diagonal side with respect to the pixel in the design increases. In this case, performing crosstalk correction increases noise. Accordingly, in a case where $\lambda$ satisfies the relationship of $-0.3<\lambda$, the crosstalk light intensity to the pixel on the diagonal side with respect to the pixel in the design decreases, and the noise due to the crosstalk correction may thus be reduced.

Specific Examples will be described below.

EXAMPLE 3

Matrix $G_m$ that expresses the crosstalk amounts in a case where $\alpha=73\%$, $\beta=12\%$, $\gamma=10\%$, and $\delta=5\%$ and inverse matrix $G_m^{-1}$ are provided.

$$G_m = \begin{pmatrix} 0.73 & 0.12 & 0.10 & 0.05 \\ 0.12 & 0.73 & 0.05 & 0.1 \\ 0.1 & 0.05 & 0.73 & 0.12 \\ 0.05 & 0.1 & 0.12 & 0.73 \end{pmatrix}$$

$$G_m^{-1} = \begin{pmatrix} 1.43235931 & -0.2180736 & -0.1747835 & -0.0395022 \\ -0.2180736 & 1.43235931 & -0.0395022 & -0.1747835 \\ -0.1747835 & -0.0395022 & 1.43235931 & -0.2180736 \\ -0.0395022 & -0.1747835 & -0.2180736 & 1.43235931 \end{pmatrix}$$

As described above, in a case where $\beta\approx\gamma\approx2\delta$ and $\alpha>70\%$, $\lambda$ satisfies the relationship of $-0.16<\lambda$. This allows a light beam with a sufficient light intensity to be incident on the pixel in the design, thereby reducing an increase in noise even if the crosstalk correction is performed.

EXAMPLE 4

Matrix $G_m$ that expresses the crosstalk amounts in a case where $\alpha=65\%$, $\beta=14\%$, $\gamma=15\%$, and $\delta=6\%$ and inverse matrix $G_m^{-1}$ are provided.

$$G_m = \begin{pmatrix} 0.65 & 0.14 & 0.15 & 0.06 \\ 0.14 & 0.65 & 0.06 & 0.15 \\ 0.15 & 0.06 & 0.65 & 0.14 \\ 0.06 & 0.15 & 0.14 & 0.65 \end{pmatrix}$$

$$G_m^{-1} = \begin{pmatrix} 1.69293924 & -0.3308703 & -0.3596059 & -0.0024631 \\ -0.3308703 & 1.69293924 & -0.0024631 & -0.3596059 \\ -0.3596059 & -0.0024631 & 1.69293924 & -0.3308703 \\ -0.0024631 & -0.3596059 & -0.3308703 & 1.69293924 \end{pmatrix}$$

EXAMPLE 5

Matrix $G_m$ that expresses the crosstalk amounts in a case where $\alpha=82\%$, $\beta=7\%$, $\gamma=8\%$, and $\delta=3\%$ and inverse matrix $G_m^{-1}$ are provided.

$$G_m = \begin{pmatrix} 0.82 & 0.07 & 0.08 & 0.03 \\ 0.07 & 0.82 & 0.03 & 0.08 \\ 0.08 & 0.03 & 0.82 & 0.07 \\ 0.03 & 0.08 & 0.07 & 0.82 \end{pmatrix}$$

$$G_m^{-1} = \begin{pmatrix} 1.24015568 & -0.09913 & -0.1151557 & -0.02587 \\ -0.09913 & 1.24015568 & -0.02587 & -0.1151557 \\ -0.1151557 & -0.02587 & 1.24015568 & -0.09913 \\ -0.02587 & -0.1151557 & -0.09913 & 1.24015568 \end{pmatrix}$$

As described above, in a case where $\beta\approx\gamma\approx2\delta$ and $\alpha>80\%$, $\lambda$ satisfies the relationship of $-0.059<\lambda$. This means that in a case where the crosstalk light intensity is low, the absolute values of coefficient values other than diagonal components of a correction matrix overall become small, and the increase in noise in the crosstalk correction is sufficiently reduced.

In each of the Examples, $\alpha>4\beta$ and $\alpha>4\gamma$ hold true. In such a case, the value of c whose absolute value becomes the greatest among the coefficients that configure the inverse matrix becomes smaller than 2. Thus, the increase in noise of the image in a case where crosstalk correction computation is performed is sufficiently low. In a case where the value of $\epsilon$ becomes below 1.3, the increase in noise of the image in a case where the crosstalk correction computation is performed is further reduced.

In addition, the value of $\beta$ and the value of $\gamma$ as the crosstalk amounts in the left-right direction and the up-down direction may approach each other. In a case where the difference between $\beta$ and $\gamma$ is lower than 2%, 16 elements of matrix G may be expressed by 3 values. Specifically, matrix G may be expressed by the following matrix $G_s$. The difference between $\beta$ and $\gamma$ may be lower than 1%.

$$G_s = \begin{pmatrix} \alpha & \beta & \beta & \delta \\ \beta & \alpha & \delta & \beta \\ \beta & \delta & \alpha & \beta \\ \delta & \beta & \beta & \alpha \end{pmatrix}$$

Inverse matrix $G_s^{-1}$ of matrix $G_s$ is as follows:

$$G_s^{-1} = \begin{pmatrix} \varepsilon & \eta & \eta & \lambda \\ \eta & \varepsilon & \lambda & \eta \\ \eta & \lambda & \varepsilon & \eta \\ \lambda & \eta & \eta & \varepsilon \end{pmatrix}$$

In this case, the number of the storage areas necessary in the memory P of the imaging apparatus may be reduced to three, and simplification of the memory may thus be expected.

Here, in a case where $\alpha+2\beta+\gamma=1.0$ and $\alpha>\beta>\gamma\geq0$, $\epsilon>0>\lambda>\eta$.

Cases where the determinant of the above-described matrix $G_s$ becomes 0 and no inverse matrix $G_s^{-1}$ exists are limited to the case of $\alpha=\delta$ and the case of $\alpha+\gamma=50\%$. That is, using the micro-lens array configured with the micro-lenses that satisfy $\alpha>\beta>\delta$ and $\beta<25\%$ enables correction of the crosstalk.

In a case where $\alpha$ is above 97%, the influence of the crosstalk is sufficiently low, and thus the crosstalk correction computation may not be performed. Further, in a case where $\alpha$ is 45% or higher, the coefficients that configure the correction matrix become small, and the increase in noise is thus reduced.

In a case where $\alpha$ is 65% or higher, the increase in noise due to a crosstalk correction process is further reduced.

On the other hand, in a case where a pitch of the image sensor becomes smaller, geometrical-optical light concentration may not be performed, and the crosstalk amount increases. For example, in a case where the pitch of the micro-lens array is 4 μm or larger, the ratio of the incident light on the normal pixel in the design becomes 85% or higher.

Specific Examples will be described below.

EXAMPLE 6

Matrix $G_s$ that expresses the crosstalk amounts in a case where $\alpha=60\%$, $\beta=16\%$, and $\delta=8\%$ and inverse matrix $G_s^{-1}$ are as follows:

$$G_s = \begin{pmatrix} 0.6 & 0.16 & 0.16 & 0.08 \\ 0.16 & 0.6 & 0.08 & 0.16 \\ 0.16 & 0.08 & 0.6 & 0.16 \\ 0.08 & 0.16 & 0.16 & 0.6 \end{pmatrix}$$

$$G_s^{-1} = \begin{pmatrix} 1.90598291 & -0.4444444 & -0.4444444 & -0.017094 \\ -0.4444444 & 1.90598291 & -0.017094 & -0.4444444 \\ -0.4444444 & -0.017094 & 1.90598291 & -0.4444444 \\ -0.017094 & -0.4444444 & -0.4444444 & 1.90598291 \end{pmatrix}$$

EXAMPLE 7

Crosstalk matrix $G_s$ in a case where $\alpha=75\%$, $\beta=10\%$, and $\delta=5\%$ and inverse matrix $G_s^{-1}$ are provided.

$$G_s = \begin{pmatrix} 0.75 & 0.1 & 0.1 & 0.05 \\ 0.1 & 0.75 & 0.05 & 0.1 \\ 0.1 & 0.05 & 0.75 & 0.1 \\ 0.05 & 0.1 & 0.1 & 0.75 \end{pmatrix}$$

$$G_s^{-1} = \begin{pmatrix} 1.38095238 & -0.1666667 & -0.1666667 & -0.047619 \\ -0.1666667 & 1.38095238 & -0.047619 & -0.1666667 \\ -0.1666667 & -0.047619 & 1.38095238 & -0.1666667 \\ -0.047619 & -0.1666667 & -0.1666667 & 1.38095238 \end{pmatrix}$$

EXAMPLE 8

Matrix $G_s$ that expresses the crosstalk amounts in a case where $\alpha=86\%$, $\beta=6\%$, and $\delta=2\%$ and inverse matrix $G_s^{-1}$ are provided.

$$G_s = \begin{pmatrix} 0.86 & 0.06 & 0.06 & 0.02 \\ 0.06 & 0.86 & 0.02 & 0.06 \\ 0.06 & 0.02 & 0.86 & 0.06 \\ 0.02 & 0.06 & 0.06 & 0.86 \end{pmatrix}$$

$$G_s^{-1} = \begin{pmatrix} 1.17418546 & -0.0789474 & -0.0789474 & -0.0162907 \\ -0.0789474 & 1.17418546 & -0.0162907 & -0.0789474 \\ -0.0789474 & -0.0162907 & 1.17418546 & -0.0789474 \\ -0.0162907 & -0.0789474 & -0.0789474 & 1.17418546 \end{pmatrix}$$

EXAMPLE 9

Matrix $G_s$ that expresses the crosstalk amounts in a case where $\alpha=45\%$, $\beta=21\%$, and $\delta=13\%$ and inverse matrix $G_s^{-1}$ are provided.

$$G_s = \begin{pmatrix} 0.45 & 0.21 & 0.21 & 0.13 \\ 0.22 & 0.45 & 0.13 & 0.21 \\ 0.21 & 0.13 & 0.45 & 0.21 \\ 0.13 & 0.21 & 0.21 & 0.45 \end{pmatrix}$$

$$G_s^{-1} = \begin{pmatrix} 3.375 & -1.3125 & -1.3125 & 0.25 \\ -1.3125 & 3.375 & 0.25 & -1.3125 \\ -1.3125 & 0.25 & 3.375 & -1.3125 \\ 0.25 & -1.3125 & -1.3125 & 3.375 \end{pmatrix}$$

EXAMPLE 10

Matrix $G_s$ that expresses the crosstalk amounts in a case where $\alpha=96\%$, $\beta=1.5\%$, and $\delta=1\%$ and inverse matrix $G_s^{-1}$ are provided.

$$G_s = \begin{pmatrix} 0.96 & 0.015 & 0.015 & 0.01 \\ 0.015 & 0.96 & 0.01 & 0.015 \\ 0.015 & 0.01 & 0.96 & 0.015 \\ 0.01 & 0.015 & 0.015 & 0.96 \end{pmatrix}$$

$$G_s^{-1} = \begin{pmatrix} 1.04227324 & -0.0159574 & -0.0159574 & -0.0103583 \\ -0.0159574 & 1.04227324 & -0.0103583 & -0.0159574 \\ -0.0159574 & -0.0103583 & 1.04227324 & -0.0159574 \\ -0.0103583 & -0.0159574 & -0.0159574 & 1.04227324 \end{pmatrix}$$

(Second Embodiment)

A second embodiment of the imaging apparatus of the present disclosure will be described.

The imaging apparatus of this embodiment further includes a light-shielding member that causes light to pass through one optical area among n optical areas of an optical system and shields the other optical areas from light in addition to the imaging apparatus of the first embodiment.

Figure 6:
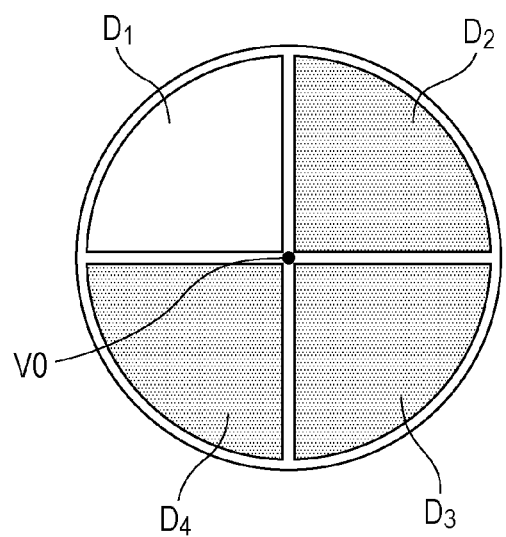
FIG. 6 is a plan view of a light-shielding member used in a second embodiment of the present disclosure.

FIG. 6 illustrates one example of the light-shielding member in a case where n is four. FIG. 6 illustrates the light-shielding member that causes light to pass through the optical area $D_1$ and shields the optical areas $D_2$, $D_3$, and $D_4$ from light, for example. The light-shielding member is configured to be rotatable around the optical axis $V_0$, for example. The light-shielding member is rotated around the optical axis $V_0$, and light may thereby be caused to selectively pass through any one of the other optical areas $D_2$, $D_3$, and $D_4$ instead of the optical area $D_1$. Alternatively, the light-shielding member may include a liquid crystal shutter and may be configured to cause light to pass through any one of the optical areas $D_1$, $D_2$, $D_3$, and $D_4$.

The light-shielding member is arranged in a vicinity of the diaphragm S of the imaging apparatus illustrated in FIG. 1 and in a position closer to the object than the diaphragm S, for example. In a case where an image of the object is captured by using the light-shielding member in such a state and it is assumed that no crosstalk occurs in the optical areas and an influence of noise may be ignored, light is incident only on the pixel $b_1$, and light is not incident on the pixels $b_2$, $b_3$, and $b_4$ in each of the groups of the image sensor. Thus, an image appears in the image signal $Q_1$ among the image signals $Q_1$, $Q_2$, $Q_3$, and $Q_4$ that are obtained from the pixel signals, and no image appears but entirely black images are output in $Q_2$ to $Q_4$. In a case where image signals by an influence other than noise are obtained in the image signals $Q_2$, $Q_3$, and $Q_4$, those are caused by the influence of the crosstalk of the micro-lens. Accordingly, the crosstalk amounts may be obtained by analyzing the images $Q_1$, $Q_2$, $Q_3$, and $Q_4$ that are obtained by capturing an image of an appropriate object in an opening state illustrated in FIG. 6 or by analyzing the pixel signals that are obtained from the pixels $b_1$, $b_2$, $b_3$, and $b_4$ in each of the groups.

Specifically, given that the sums of output signal values of all the pixels in the image signals $Q_1$, $Q_2$, $Q_3$, and $Q_4$ are $S_{m11}$, $S_{m12}$, $S_{m13}$, and $S_{m14}$, respectively, $\alpha_1 = S_{m11}/(S_{m11}+S_{m12}+S_{m13}+S_{m14})$, $\beta_1 = S_{m12}/(S_{m11}+S_{m12}+S_{m13}+S_{m14})$, $\gamma_1 = S_{m13}/(S_{m11}+S_{m12}+S_{m13}+S_{m14})$, and $\delta_1 = S_{m14}/(S_{m11}+S_{m12}+S_{m13}+S_{m14})$.

Similarly, given that the sums of the output signal values of all the pixels in the image signals $Q_1$, $Q_2$, $Q_3$, and $Q_4$ that are obtained by opening only the optical area $D_2$ and shielding the others are $S_{m21}$, $S_{m22}$, $S_{m23}$, and $S_{m24}$, respectively, $\beta_2 = S_{m21}/(S_{m21}+S_{m22}+S_{m23}+S_{m24})$, $\alpha_2 = S_{m22}/(S_{m21}+S_{m22}+S_{m23}+S_{m24})$, $\delta_2 = S_{m23}/(S_{m21}+S_{m22}+S_{m23}+S_{m24})$, and $\gamma_2 = S_{m24}/(S_{m21}+S_{m22}+S_{m23}+S_{m24})$.

Similarly, given that the sums of the output signal values of all the pixels in the image signals $Q_1$, $Q_2$, $Q_3$, and $Q_4$ that are obtained by opening only the optical area $D_3$ and shielding the others are $S_{m31}$, $S_{m32}$, $S_{m33}$, and $S_{m34}$, respectively, $\beta_3 = S_{m31}/(S_{m31}+S_{m32}+S_{m33}+S_{m34})$, $\alpha_3 = S_{m32}/(S_{m31}+S_{m32}+S_{m33}+S_{m34})$, $\delta_3 = S_{m33}/(S_{m31}+S_{m32}+S_{m33}+S_{m34})$, and $\gamma_3 = S_{m34}/(S_{m31}+S_{m32}+S_{m33}+S_{m34})$.

Similarly, given that the sums of the output signal values of all the pixels in the image signals $Q_1$, $Q_2$, $Q_3$, and $Q_4$ that are obtained by opening only the optical area $D_4$ and shielding the others are $S_{m41}$, $S_{m42}$, $S_{m43}$, and $S_{m44}$, respectively, $\beta_4 = S_{m41}/(S_{m41}+S_{m42}+S_{m43}+S_{m44})$, $\alpha_4 = S_{m42}/(S_{m41}+S_{m42}+S_{m43}+S_{m44})$, $\delta_4 = S_{m43}/(S_{m41}+S_{m42}+S_{m43}+S_{m44})$, and $\gamma_4 = S_{m44}/(S_{m41}+S_{m42}+S_{m43}+S_{m44})$.

The processor C calculates the image signals $Q_1$, $Q_2$, $Q_3$, and $Q_4$, further performs the above-described computation by using the image signals $Q_1$, $Q_2$, $Q_3$, and $Q_4$, and calculates the group of coefficients. The processor C forms matrix G that expresses the crosstalk amounts described in the first embodiment, obtains inverse matrix $G^{-1}$, and stores that in the memory P. Here, in a case where the differences among $\alpha_1$, $\alpha_2$, $\alpha_3$, and $\alpha_4$, the differences among $\beta_1$, $\beta_2$, $\beta_3$, and $\beta_4$, the differences among $\gamma_1$, $\gamma_2$, $\gamma_3$, and $\gamma_4$, and the differences among $\delta_1$, $\delta_2$, $\delta_3$, and $\delta_4$ are lower than approximately 3%, matrix G is in the form of matrix $G_m$ described with the respective average values $\alpha$, $\beta$, $\gamma$, and $\delta$ in the first embodiment. The differences among $\alpha_1$, $\alpha_2$, $\alpha_3$, and $\alpha_4$, the differences among $\beta_1$, $\beta_2$, $\beta_3$, and $\beta_4$, the differences among $\gamma_1$, $\gamma_2$, $\gamma_3$, and $\gamma_4$, and the differences among $\delta_1$, $\delta_2$, $\delta_3$, and $\delta_4$ may be lower than approximately 1%.

In such a case, $\alpha+\beta+\gamma+\delta=1$ holds. Thus, the processor C calculates three values among $\alpha$, $\beta$, $\gamma$, and $\delta$, matrix $G_m$ is generated based on the values, and inverse matrix $G_m^{-1}$ may thereby be obtained. Alternatively, the sum of intensity of $S_{m11}$, $S_{m12}$, $S_{m13}$, and $S_{m14}$, the sum of intensity of $S_{m21}$, $S_{m22}$, $S_{m23}$, and $S_{m24}$, the sum of intensity of $S_{m31}$, $S_{m32}$, $S_{m33}$, and $S_{m34}$, and the sum of intensity of $S_{m41}$, $S_{m42}$, $S_{m43}$, and $S_{m44}$ are input to the processor C, and the processor C may thereby calculates $\alpha$, $\beta$, $\gamma$, and $\delta$ based on those inputs.

In addition, in a case where the difference between $\beta$ and $\gamma$ in matrix $G_m$ is lower than 1%, approximation of $\beta \approx \gamma$ is performed, and matrix $G_s$ described as the matrix that expresses the crosstalk amounts in the first embodiment may be used. In this case, $\alpha+2\beta+\delta=1$ holds. Thus, the processor C calculates two values among $\alpha$, $\beta$, and $\delta$, matrix $G_s$ is generated based on the values, and inverse matrix $G_s^{-1}$ may thereby be obtained. Alternatively, three values of the sum of intensity of incident light on the normal pixel, the sum of intensity of incident light on the neighboring pixel, and the sum of intensity of incident light on the diagonal pixel are input, $\alpha$, $\beta$, and $\delta$ are calculated based on the three values, and inverse matrix $G_s^{-1}$ may thereby be obtained.

Further, the sums of output signal values of all the pixels of the image signals $Q_1$, $Q_2$, $Q_3$, and $Q_4$ are used for obtaining the crosstalk matrix. However, obtainment of the crosstalk matrix is not limited to this. Instead of this, average values of the output signal values of all the pixels may be used to obtain the crosstalk matrix. Further, the output signal values of not all the pixels but the pixels that correspond to the same positions in the images $Q_1$, $Q_2$, $Q_3$, and $Q_4$ are used to obtain the sums, averages, or the like thereof, and the crosstalk matrix may thereby be calculated.

Above-described matrix G and inverse matrix $G^{-1}$ are calculated at each time when at least one of the optical characteristics of the optical lens system L, the focal point, the size of the lens pupil, and the like changes, and thereby the crosstalk may more certainly be reduced.

EXAMPLE

Figure 7:
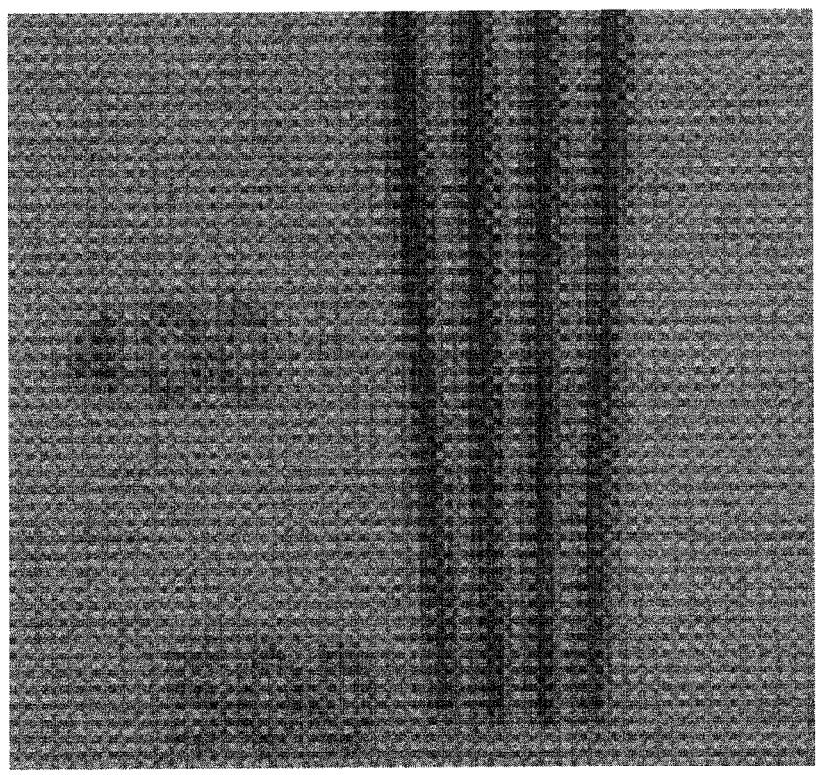
FIG. 7 is a diagram illustrating an example of an image obtained in an example.

FIG. 7, on large scale, illustrates one example of a case where an image of an object is captured in a state where light passes through only the optical area $D_3$ by using the light-shielding member and the image signals are generated without extracting the pixel signals from the pixel $b_1$, $b_2$, $b_3$, and $b_4$ in each of the groups. Because the pixel signals are not extracted selectively from the pixels $b_1$, $b_2$, $b_3$, and $b_4$ in each of the groups, an image illustrated in FIG. 7 reflects the arrangement of the pixels illustrated in FIG. 4. Thus, if no crosstalk were present, the object would be detected in the pixel $b_3$, and the object would not be detected in the pixels $b_1$, $b_2$, and $b_4$ that neighbor the pixel $b_3$. That is, the object would be formed in the pixel $b_3$ in each of the groups, and an image displayed in black would be obtained in the pixels $b_1$, $b_2$, and $b_4$. However, as it is understood from FIG. 7, the image does not become black in the positions that correspond to the pixels $b_1$, $b_2$, and $b_4$. This is because the crosstalk occurs.

Figure 8A:
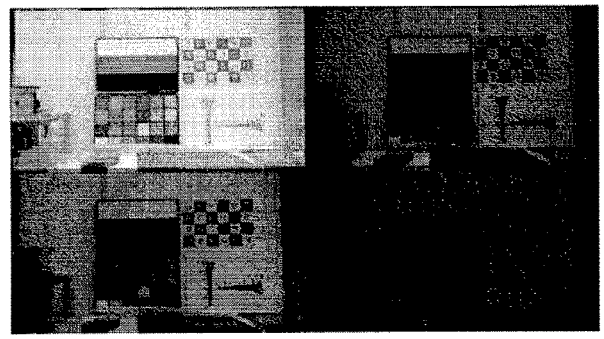
FIG. 8A is a diagram illustrating an example of an image in which the crosstalk occurs.
Figure 8B:
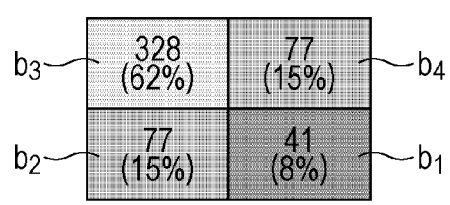
FIG. 8B is a diagram illustrating crosstalk amounts.

FIG. 8A illustrates an example where images by the image signals $Q_1$, $Q_2$, $Q_3$, and $Q_4$ are displayed correspondingly to the positions of the pixels $b_1$, $b_2$, $b_3$, and $b_4$ in each of the groups in a case where the pixel signals obtained from the pixels $b_1$, $b_2$, $b_3$, and $b_4$ in each of the groups are extracted for each of the pixels and the image signals $Q_1$, $Q_2$, $Q_3$, and $Q_4$ are thereby generated. Further, averages of the luminance values of the pixels $b_1$, $b_2$, $b_3$, and $b_4$ in the groups are obtained. FIG. 8B illustrates the obtained averages correspondingly to the positions of the pixels $b_1$, $b_2$, $b_3$, and $b_4$. In FIGS. 8A and 8B, values in the pixels represent the intensities of the signals, and values in parentheses represent the ratios.

In FIG. 8A, if no crosstalk were present, images would not appear in the optical areas other than the one in the left higher position and would be displayed in black. However, as it is understood from FIG. 8A, images are displayed in the optical areas other than the one in the left higher position due to the crosstalk although the images are darker than the image in the left higher position. As illustrated in FIG. 8B, the ratio of light incident on the pixel $b_3$ and passes through the optical area $D_1$ is 62%. From results represented in FIG. 8B, it may be considered that light that passes through the optical areas $D_1$, $D_2$, and $D_4$ is incident on the pixel $b_3$ by ratios of approximately 8%, 15%, and 15% in a case where the light-shielding member is not provided.

Figure 9A:
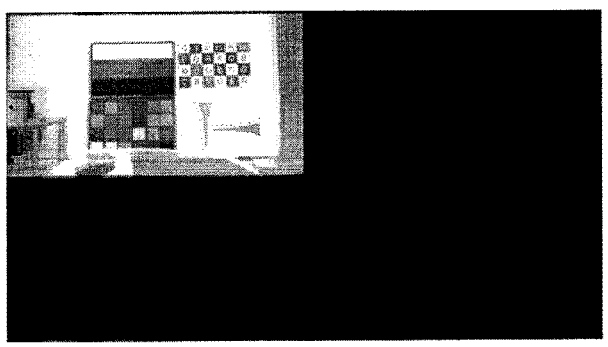
FIG. 9A is a diagram illustrating an example of an image in which the crosstalk is reduced.
Figure 9B:
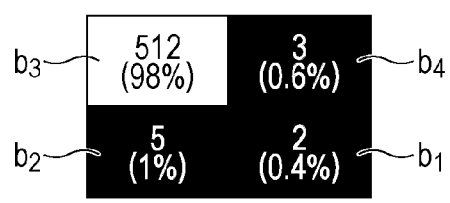
FIG. 9B is a diagram illustrating the crosstalk amounts.

FIGS. 9A and 9B illustrate results that are obtained by forming matrix G by the above-described computation, obtaining inverse matrix $G^{-1}$, and thereby correcting the pixel signals, correspondingly to FIGS. 8A and 8B. As it is clear from FIGS. 9A and 9B, it may be understood that the luminance of the image by the image signal $Q_3$ illustrated in the left higher position of the FIGS. 9A and 9B is enhanced by correcting the pixel signals and the images obtained by the other image signals become almost black. As described above, in this embodiment, the influence of the crosstalk is effectively reduced.

(Third Embodiment)

Figure 10:
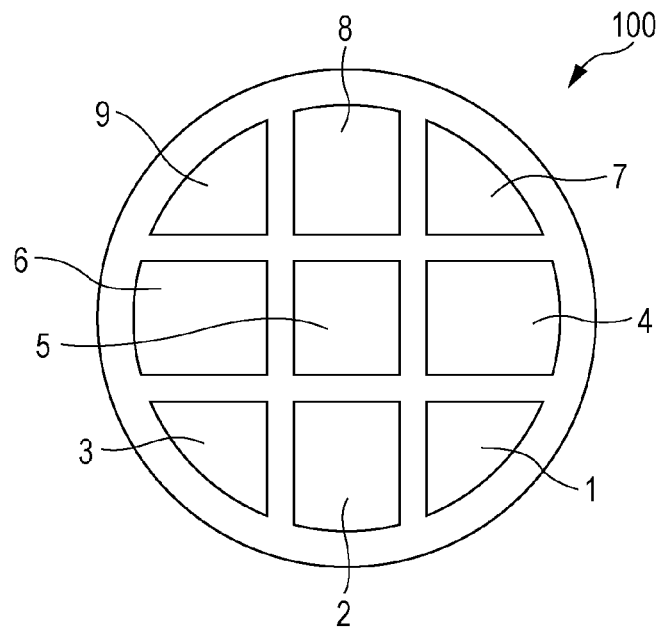
FIG. 10 is a schematic diagram illustrating an area divided polarizer in an optical lens system of an imaging apparatus according to a third embodiment.

FIG. 10 is a schematic diagram illustrating an area divided polarizer 100 in an optical lens system of an imaging apparatus according to a third embodiment of the present disclosure. The area divided polarizer 100 in the imaging apparatus according to the third embodiment has nine optical areas 1, 2, 3, 4, 5, 6, 7, 8, and 9 that are arrayed with three optical areas in the horizontal direction and three optical areas in the vertical direction.

Figure 11:
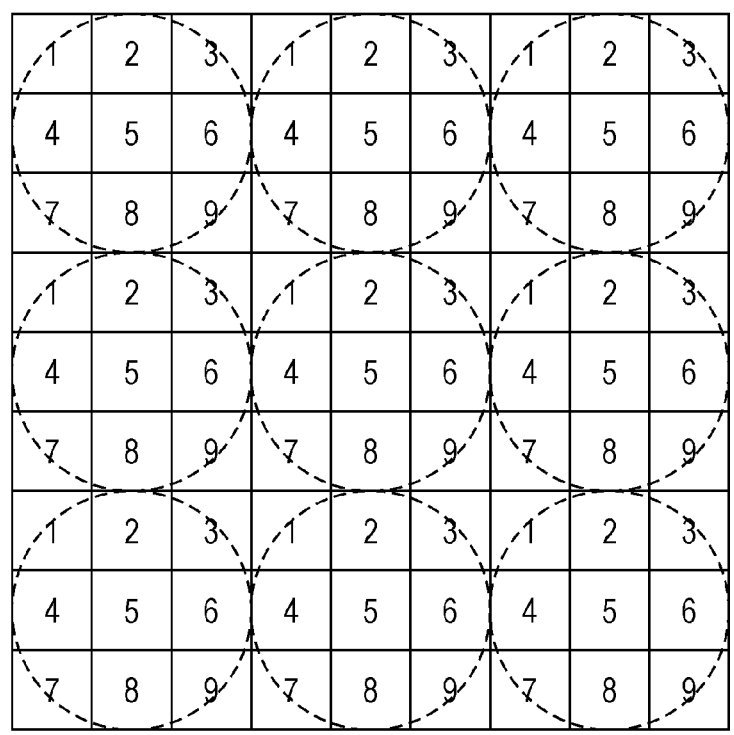
FIG. 11 is a diagram illustrating incident situations of light beams on an image sensor of the imaging apparatus according to the third embodiment.

FIG. 11 is a diagram that explains incident situations of light beams on an image sensor of the imaging apparatus according to the third embodiment. In FIG. 11, 81 pixels are arrayed with nine pixels in the horizontal direction and nine pixels in the vertical direction on an image-capturing surface of the image sensor. In the imaging apparatus according to the third embodiment, a single micro-lens in the optical element array is arranged to correspond to pixels in three rows and three columns. In FIG. 11, the micro-lenses are illustrated by broken lines. Light beams that pass through the optical areas 1 to 9 of the area divided polarizer 100 are mainly incident on respective pixels to which numbers of 1 to 9 are provided by an image formation effect of the micro-lens.

In a case where symmetry holds true with the crosstalk amounts in plural pixels that are arrayed on the image-capturing surface of the imaging apparatus, the crosstalk occurs in the following three cases. That is, the three cases are a case where light that passes through the optical areas that are positioned in corners of the area divided polarizer 100, that is, the optical areas 1, 3, 7, and 9, is incident on the pixels other than the normal pixels in the design, a case where light that passes through the optical areas that are positioned in side portions of the area divided polarizer 100, that is, the optical areas 2, 4, 6, and 8, is incident on the pixels other than the normal pixels in the design, and a case where light that passes through the optical area 5 positioned at the center of the area divided polarizer 100 is incident on the pixels other than the normal pixel in the design.

Figures 12, 13, 14:
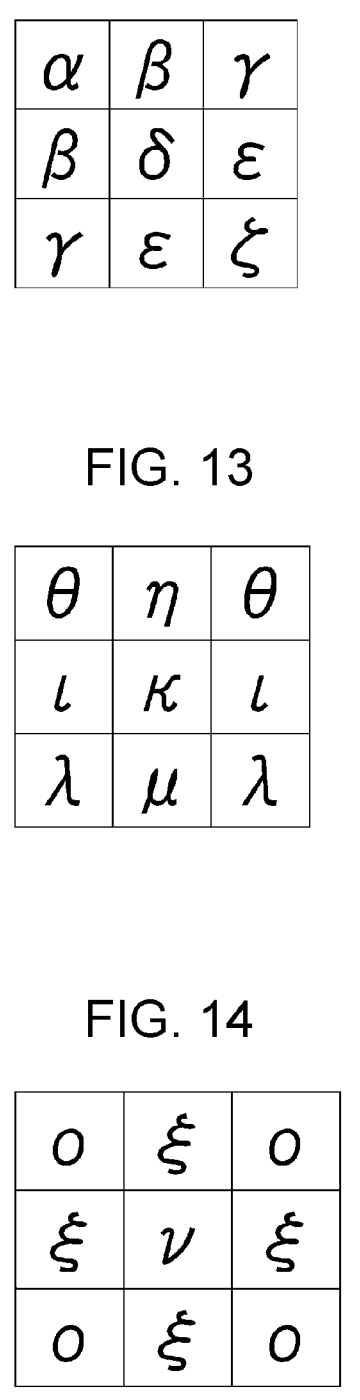

FIGS. 12 to 14 are diagrams that explain examples of situations of the crosstalk in the imaging apparatus according to the third embodiment.

FIG. 12 illustrates the proportions in which light that passes through the optical area 1 among the optical areas that are positioned in the corners of the area divided polarizer 100 are distributed to the pixels in three rows and three columns that are present immediately under the micro-lens. In FIG. 12, reference symbols $\alpha$, $\beta$, $\gamma$, $\delta$, $\epsilon$, and $\zeta$ represent the ratios of light incident on the pixels. The light represented by a ratio $\alpha$ is a normal incident component, and the light represented by ratios $\beta$, $\gamma$, $\delta$, $\epsilon$, and $\zeta$ are crosstalk components. In FIG. 12, the optical areas 2 and 4, the optical areas 3 and 7, and the optical areas 6 and 8 are in the same relative positional relationship with the optical area 1. Thus, it is assumed that the proportions of the incident crosstalk light are the same. In a case where optical loss due to absorption and so forth may be ignored, the relationship of $$\alpha+2\times\beta+2\times\gamma+\delta+2\times\epsilon+\zeta=100\%$$

holds true.

FIG. 13 illustrates the proportions in which light that passes through the optical area 2 among the optical areas that are positioned in the side portions of the area divided polarizer 100 are distributed to the pixels in three rows and three columns that are present immediately under the micro-lens. In FIG. 13, reference symbols $\eta$, $\theta$, $\iota$, $\kappa$, $\lambda$, and $\mu$ represent the ratios of light incident on the pixels. The light represented by a ratio $\eta$ is the normal incident component, and the light represented by ratios $\theta$, $\iota$, $\kappa$, $\lambda$, and $\mu$ are the crosstalk components. In FIG. 13, the optical areas 1 and 3, the optical areas 4 and 6, and the optical areas 7 and 9 are in the same relative positional relationship with the optical area 2. Thus, it is assumed that the proportions of the incident crosstalk light are the same. In a case where optical loss due to absorption and so forth may be ignored, the relationship of $$\eta+2\times\theta+2\times\iota+\kappa+2\times\lambda+\mu=100\%$$

holds true.

FIG. 14 illustrates the proportions in which light that passes through the optical area 5 positioned at the center of the area divided polarizer 100 are distributed to the pixels in three rows and three columns that are present immediately under the micro-lens. In FIG. 14, reference symbols ν, ξ, and o represent the ratios of light incident on the pixels. The light represented by a ratio ν is the normal incident component, and the light represented by ratios ξ and o are the crosstalk components. In FIG. 14, the optical areas 2, 4, 6, and 8, and the optical areas 1, 3, 7, and 9 are in the same relative positional relationship with the optical area 5. Thus, it is assumed that the proportions of the incident crosstalk light are the same. In a case where optical loss due to absorption and so forth may be ignored, the relationship of $$\nu + 4 \times \xi + 4 \times o = 100\%$$

holds true.

Given that measured signal values of the pixels that correspond to the optical areas 1 to 9 are set as measured signal values $x_1$ to $x_9$, light intensities of light that passes through the optical areas 1 to 9 and arrives at the micro-lens are set as light intensities $x'_1$ to $x'_9$, and the crosstalk matrix is G, the following relationship holds true.

$$\begin{bmatrix} x_1 \\ x_2 \\ x_3 \\ x_4 \\ x_5 \\ x_6 \\ x_7 \\ x_8 \\ x_9 \end{bmatrix} = G \begin{bmatrix} x'_1 \\ x'_2 \\ x'_3 \\ x'_4 \\ x'_5 \\ x'_6 \\ x'_7 \\ x'_8 \\ x'_9 \end{bmatrix}$$

Here, matrix G and inverse matrix $G^{-1}$ are expressed by the following equations.

$$G = \begin{pmatrix} \alpha & \beta & \gamma & \beta & \delta & \varepsilon & \gamma & \varepsilon & \zeta \\ \theta & \eta & \theta & \iota & \kappa & \iota & \lambda & \mu & \lambda \\ \gamma & \beta & \alpha & \varepsilon & \delta & \beta & \zeta & \varepsilon & \gamma \\ \theta & \iota & \lambda & \eta & \kappa & \mu & \theta & \iota & \lambda \\ o & \xi & o & \xi & \nu & \xi & o & \xi & o \\ \lambda & \iota & \theta & \mu & \kappa & \eta & \lambda & \iota & \theta \\ \gamma & \varepsilon & \zeta & \beta & \delta & \varepsilon & \alpha & \beta & \gamma \\ \lambda & \mu & \lambda & \iota & \kappa & \iota & \theta & \eta & \theta \\ \zeta & \varepsilon & \gamma & \varepsilon & \delta & \beta & \gamma & \beta & \alpha \end{pmatrix}$$

$$G^{-1} = \begin{pmatrix} a & b & c & b & d & e & c & e & f \\ h & g & h & i & j & i & k & l & k \\ c & b & a & e & d & b & f & e & c \\ h & i & k & g & j & l & h & i & k \\ o & n & o & n & m & n & o & n & o \\ k & i & h & l & j & g & k & i & h \\ c & e & f & b & d & e & a & b & c \\ k & l & k & i & j & i & h & g & h \\ f & e & c & e & d & b & c & b & a \end{pmatrix}$$

The ratio α by which light that passes through the optical area 1 positioned in the corner of the area divided polarizer 100 is incident on the normal pixel in the design, the ratio η by which light that passes through the optical area 2 positioned in the side portion of the area divided polarizer 100 is incident on the normal pixel in the design, and the ratio ν by which light that passes through the optical area 5 positioned at the center of the area divided polarizer 100 is incident on the normal pixel in the design are all approximately 0.48 or higher. In this case, all of component a, component g, and component m that are the diagonal components of inverse matrix $G^{-1}$ become values greater than 1 and smaller than 2.3. In a case where all of component a, component g, and component m are smaller than 2.3, the proportion of the incident light on the normal pixel to the entire incident light becomes 48% or higher. Thus, the increase in noise due to the crosstalk correction may be reduced.

In a case where all the ratios α, η, and ν are values greater than 0.95, loss in image quality due to the crosstalk is sufficiently small even if the crosstalk correction is not performed. In this case, all the values of component a, component g, and component m become lower than 1.053.

EXAMPLE 11

Matrix G that is the crosstalk matrix and inverse matrix $G^{-1}$ that is a crosstalk correction matrix in a case where α=0.88, β=0.02, γ=0.018, δ=0.012, ε=0.011, ζ=0.01, η=0.886, θ=0.019, ι=0.012, κ=0.021, λ=0.01, μ=0.011, ν=0.88, ξ=0.02, and o=0.01 are provided below.

$$G = \begin{pmatrix} 0.88 & 0.02 & 0.018 & 0.02 & 0.012 & 0.011 & 0.018 & 0.011 & 0.01 \\ 0.019 & 0.886 & 0.019 & 0.012 & 0.021 & 0.012 & 0.01 & 0.011 & 0.01 \\ 0.018 & 0.02 & 0.88 & 0.011 & 0.012 & 0.02 & 0.01 & 0.011 & 0.018 \\ 0.019 & 0.012 & 0.01 & 0.886 & 0.021 & 0.011 & 0.019 & 0.012 & 0.01 \\ 0.01 & 0.02 & 0.01 & 0.02 & 0.88 & 0.02 & 0.01 & 0.02 & 0.01 \\ 0.01 & 0.012 & 0.019 & 0.011 & 0.021 & 0.886 & 0.01 & 0.012 & 0.019 \\ 0.018 & 0.011 & 0.01 & 0.02 & 0.012 & 0.011 & 0.88 & 0.02 & 0.018 \\ 0.01 & 0.011 & 0.01 & 0.012 & 0.021 & 0.012 & 0.019 & 0.886 & 0.019 \\ 0.01 & 0.011 & 0.018 & 0.011 & 0.012 & 0.02 & 0.018 & 0.02 & 0.88 \end{pmatrix}$$

$$G^{-1} = \begin{pmatrix} 1.13882 & -0.02389 & -0.02149 & -0.02389 & -0.01308 & -0.01206 & -0.02149 & -0.01206 & -0.01085 \\ -0.02275 & 1.13104 & -0.02275 & -0.01325 & -0.02515 & -0.01325 & -0.01092 & -0.01206 & -0.01092 \\ -0.02149 & -0.02389 & 1.13882 & -0.01206 & -0.01308 & -0.02389 & -0.01085 & -0.01206 & -0.02149 \\ -0.02275 & -0.01325 & -0.01092 & 1.13104 & -0.02515 & -0.01206 & -0.02275 & -0.01325 & -0.01092 \\ -0.01080 & -0.02401 & -0.01080 & -0.02401 & 1.13924 & -0.02401 & -0.01080 & -0.02401 & -0.01080 \\ -0.01092 & -0.01325 & -0.02275 & -0.01206 & -0.02515 & 1.13104 & -0.01092 & -0.01325 & -0.02275 \\ -0.02149 & -0.01206 & -0.01085 & -0.02389 & -0.01308 & -0.01206 & 1.13882 & -0.02389 & -0.02149 \\ -0.01092 & -0.01206 & -0.01092 & -0.01325 & -0.02515 & -0.01325 & -0.02275 & 1.13104 & -0.02275 \\ -0.01085 & -0.01206 & -0.02149 & -0.01206 & -0.01308 & -0.02389 & -0.02149 & -0.02389 & 1.13882 \end{pmatrix}$$

EXAMPLE 12

Matrix G that is the crosstalk matrix and inverse matrix $G^{-1}$ that is the crosstalk correction matrix in a case where $\alpha=0.76$, $\beta=0.04$, $\gamma=0.036$, $\delta=0.024$, $\epsilon=0.022$, $\zeta=0.02$, $\eta=0.658$, $\theta=0.057$, $\iota=0.036$, $\kappa=0.063$, $\lambda=0.03$, $\mu=0.033$, $\nu=0.52$, $\xi=0.08$, and $o=0.04$ are provided below.

$$G = \begin{pmatrix} 0.76 & 0.04 & 0.036 & 0.04 & 0.024 & 0.022 & 0.036 & 0.022 & 0.02 \\ 0.057 & 0.658 & 0.057 & 0.036 & 0.063 & 0.036 & 0.03 & 0.033 & 0.03 \\ 0.036 & 0.04 & 0.76 & 0.022 & 0.024 & 0.04 & 0.02 & 0.022 & 0.036 \\ 0.057 & 0.036 & 0.03 & 0.658 & 0.063 & 0.033 & 0.057 & 0.036 & 0.03 \\ 0.04 & 0.08 & 0.04 & 0.08 & 0.52 & 0.08 & 0.04 & 0.08 & 0.04 \\ 0.03 & 0.036 & 0.057 & 0.033 & 0.063 & 0.658 & 0.03 & 0.036 & 0.057 \\ 0.036 & 0.022 & 0.02 & 0.04 & 0.024 & 0.022 & 0.76 & 0.04 & 0.036 \\ 0.03 & 0.033 & 0.03 & 0.036 & 0.063 & 0.036 & 0.057 & 0.658 & 0.057 \\ 0.02 & 0.022 & 0.036 & 0.022 & 0.024 & 0.04 & 0.036 & 0.04 & 0.76 \end{pmatrix}$$

$$G^{-1} = \begin{pmatrix} 1.33460 & -0.06541 & -0.04871 & -0.06541 & -0.03395 & -0.02641 & -0.04871 & -0.02641 & -0.01959 \\ -0.09424 & 1.56056 & -0.09424 & -0.04888 & -0.16004 & -0.04888 & -0.03573 & -0.04281 & -0.03573 \\ -0.04871 & -0.06541 & 1.33460 & -0.02641 & -0.03395 & -0.06541 & -0.01959 & -0.02641 & -0.04871 \\ -0.09424 & -0.04888 & -0.03573 & 1.56056 & -0.16004 & -0.04281 & -0.09424 & -0.04888 & -0.03573 \\ -0.05367 & -0.20433 & -0.05367 & -0.20433 & 2.03201 & -0.20433 & -0.05367 & -0.20433 & -0.05367 \\ -0.03573 & -0.04888 & -0.09424 & -0.04281 & -0.16004 & 1.56056 & -0.03573 & -0.04888 & -0.09424 \\ -0.04871 & -0.02641 & -0.01959 & -0.06541 & -0.03395 & -0.02641 & 1.33460 & -0.06541 & -0.04871 \\ -0.03573 & -0.04281 & -0.03573 & -0.04888 & -0.16004 & -0.04888 & -0.09424 & 1.56056 & -0.09424 \\ -0.01959 & -0.02641 & -0.04871 & -0.02641 & -0.03395 & -0.06541 & -0.04871 & -0.06541 & 1.33460 \end{pmatrix}$$

EXAMPLE 13

Matrix G that is the crosstalk matrix and inverse matrix $G^{-1}$ that is the crosstalk correction matrix in a case where $\alpha=0.496$, $\beta=0.084$, $\gamma=0.0756$, $\delta=0.0504$, $\epsilon=0.0462$, $\zeta=0.042$, $\eta=0.487$, $\theta=0.0855$, $\iota=0.054$, $\kappa=0.0945$, $\lambda=0.045$, $\mu=0.0495$, $\nu=0.484$, $\xi=0.086$, and $o=0.043$ are provided below.

$$G = \begin{pmatrix} 0.496 & 0.084 & 0.0756 & 0.084 & 0.0504 & 0.0462 & 0.0756 & 0.0462 & 0.042 \\ 0.0855 & 0.487 & 0.0855 & 0.054 & 0.0945 & 0.054 & 0.045 & 0.0495 & 0.045 \\ 0.0756 & 0.084 & 0.496 & 0.0462 & 0.0504 & 0.084 & 0.042 & 0.0462 & 0.0756 \\ 0.0855 & 0.054 & 0.045 & 0.487 & 0.0945 & 0.0495 & 0.0855 & 0.054 & 0.045 \\ 0.043 & 0.086 & 0.043 & 0.086 & 0.484 & 0.086 & 0.043 & 0.086 & 0.043 \\ 0.045 & 0.054 & 0.0855 & 0.0495 & 0.0945 & 0.487 & 0.045 & 0.054 & 0.0855 \\ 0.0756 & 0.0462 & 0.042 & 0.084 & 0.0504 & 0.0462 & 0.496 & 0.084 & 0.0756 \\ 0.045 & 0.0495 & 0.045 & 0.054 & 0.0945 & 0.054 & 0.0855 & 0.487 & 0.0855 \\ 0.042 & 0.0462 & 0.0756 & 0.0462 & 0.0504 & 0.084 & 0.0756 & 0.084 & 0.496 \end{pmatrix}$$

$$G^{-1} = \begin{pmatrix} 2.19384 & -0.26350 & -0.21738 & -0.26350 & -0.04835 & -0.07021 & -0.21738 & -0.07021 & -0.04329 \\ -0.27251 & 2.24293 & -0.27251 & -0.08468 & -0.31914 & -0.08468 & -0.06542 & -0.07857 & -0.06542 \\ -0.21738 & -0.26350 & 2.19384 & -0.07021 & -0.04835 & -0.26350 & -0.04329 & -0.07021 & -0.21738 \\ -0.27251 & -0.08468 & -0.06542 & 2.24293 & -0.31914 & -0.07857 & -0.27251 & -0.08468 & -0.06542 \\ -0.03234 & -0.29519 & -0.03234 & -0.29519 & 2.31013 & -0.29519 & -0.03234 & -0.29519 & -0.03234 \\ -0.06542 & -0.08468 & -0.27251 & -0.07857 & -0.31914 & 2.24293 & -0.06542 & -0.08468 & -0.27251 \\ -0.21738 & -0.07021 & -0.04329 & -0.26350 & -0.04835 & -0.07021 & 2.19384 & -0.26350 & -0.21738 \\ -0.06542 & -0.07857 & -0.06542 & -0.08468 & -0.31914 & -0.08468 & -0.27251 & 2.24293 & -0.27251 \\ -0.04329 & -0.07021 & -0.21738 & -0.07021 & -0.04835 & -0.26350 & -0.21738 & -0.26350 & 2.19384 \end{pmatrix}$$

EXAMPLE 14

Matrix G that is the crosstalk matrix and inverse matrix $G^{-1}$ that is the crosstalk correction matrix in a case where $\alpha=0.95$, $\beta=0.0075$, $\gamma=0.0065$, $\delta=0.006$, $\epsilon=0.0055$, $\zeta=0.005$, $\eta=0.95$, $\theta=0.0075$, $\iota=0.0055$, $\kappa=0.0085$, $\lambda=0.005$, $\mu=0.0055$, $\nu=0.95$, $\xi=0.0075$, and $o=0.005$ are provided below.

$$G = \begin{pmatrix} 0.95 & 0.0075 & 0.0065 & 0.0075 & 0.006 & 0.0055 & 0.0065 & 0.0055 & 0.005 \\ 0.0075 & 0.95 & 0.0075 & 0.0055 & 0.0085 & 0.0055 & 0.005 & 0.0055 & 0.005 \\ 0.0065 & 0.0075 & 0.95 & 0.0055 & 0.006 & 0.0075 & 0.005 & 0.0055 & 0.0065 \\ 0.0075 & 0.0055 & 0.005 & 0.95 & 0.0085 & 0.0055 & 0.0075 & 0.0055 & 0.005 \\ 0.005 & 0.0075 & 0.005 & 0.0075 & 0.95 & 0.0075 & 0.005 & 0.0075 & 0.005 \\ 0.005 & 0.0055 & 0.0075 & 0.0055 & 0.0085 & 0.95 & 0.005 & 0.0055 & 0.0075 \\ 0.0065 & 0.0055 & 0.005 & 0.0075 & 0.006 & 0.0055 & 0.95 & 0.0075 & 0.0065 \\ 0.005 & 0.0055 & 0.005 & 0.0055 & 0.0085 & 0.0055 & 0.0075 & 0.95 & 0.0075 \\ 0.005 & 0.0055 & 0.0065 & 0.0055 & 0.006 & 0.0075 & 0.0065 & 0.0075 & 0.95 \end{pmatrix}$$

$$G^{-1} = \begin{pmatrix} 1.05297 & -0.00802 & -0.00692 & -0.00802 & -0.00628 & -0.00578 & -0.00692 & -0.00578 & -0.00524 \\ -0.00804 & 1.05299 & -0.00804 & -0.00578 & -0.00910 & -0.00578 & -0.00524 & -0.00578 & -0.00524 \\ -0.00692 & -0.00802 & 1.05297 & -0.00578 & -0.00628 & -0.00802 & -0.00524 & -0.00578 & -0.00692 \\ -0.00804 & -0.00578 & -0.00524 & 1.05299 & -0.00910 & -0.00578 & -0.00804 & -0.00578 & -0.00524 \\ -0.00523 & -0.00803 & -0.00523 & -0.00803 & 1.05305 & -0.00803 & -0.00523 & -0.00803 & -0.00523 \\ -0.00524 & -0.00578 & -0.00804 & -0.00578 & -0.00910 & 1.05299 & -0.00524 & -0.00578 & -0.00804 \\ -0.00692 & -0.00578 & -0.00524 & -0.00802 & -0.00628 & -0.00578 & 1.05297 & -0.00902 & -0.00692 \\ -0.00524 & -0.00578 & -0.00524 & -0.00578 & -0.00910 & -0.00578 & -0.00804 & 1.05299 & -0.00804 \\ -0.00524 & -0.00578 & -0.00692 & -0.00578 & -0.00628 & -0.00802 & -0.00692 & -0.00802 & 1.05297 \end{pmatrix}$$

The matrices that are exemplified in this embodiment are matrices in which numbers are allocated to the optical areas and the corresponding pixels as illustrated in FIGS. 10 and 11 and elements are arranged in the order of the numbers. Accordingly, in a case where allocation of the numbers to the optical areas and the corresponding pixels is changed, the arrangement of the elements of the matrices is appropriately changed in response to the allocation.

Further, in this embodiment, a description is made with an example where computation by using the matrix of nine rows and nine columns is performed with respect to the nine pixel signals obtained from the nine pixels and converted pixel signals are thereby calculated. However, calculation of the converted pixel signals is not limited to this. In this embodiment, in a case where there is a ratio that may approximate zero among the ratios $\beta$, $\gamma$, $\delta$, $\epsilon$, $\zeta$, $\theta$, $\iota$, $\kappa$, $\lambda$, $\mu$, $\xi$, and $o$ that represent the proportions of the crosstalk light, matrix G is a matrix that contains zero in elements thereof. In this case, instead of calculating the converted pixel signals as a matrix product of the matrix of nine rows and nine columns and a row vector with nine columns, the converted pixel signals may be calculated as multiply-accumulate calculation from which products containing zero are removed. In such calculation, the converted pixel signals may be calculated by a less calculation amount.

The imaging apparatus according to the embodiments of the present disclosure is not limited to the above-described embodiments, and various modifications from the above embodiments are possible.

In the above-described embodiments, a description is made with an example where the area divided polarizer that has different polarization characteristics for the optical areas are arranged in the vicinity of the diaphragm S. However, instead of the area divided polarizer, optical filters that have different spectral transmittances for the optical areas may be arranged in the vicinity of the diaphragm S. In this case, images in plural different wavelength bands may simultaneously be captured. For example, plural narrow-band wavelength filters are used as the optical filters, and respective wavelength ranges may thereby be observed. Further, for example, filters that cause rays in an infra-red range or an ultra-violet range to pass through are used as the optical filters, and images in respective wavelength ranges may thereby be obtained. Further, both of a polarization element and the optical filter may be arranged in the optical area. The optical filter may be arranged on the pixels of the image sensor, and only the polarization element may be arranged in the optical area of the optical lens system.

Optical filters that have different transmittances for the optical areas may be arranged in the vicinity of the diaphragm S. Alternatively, the area of the opening of the optical area may be changed with respect to each of the optical areas. In such a configuration, plural images under different exposure conditions may be obtained. Accordingly, in a case where the contrast between light and darkness on the object is high, a dynamic range of the image sensor may be expanded. Further, such a configuration enables high dynamic range imaging in which plural images under different exposure conditions are obtained and a single image with a wide dynamic range is thereafter synthesized from the plural image.

In this embodiment, the four or nine optical areas are provided in a stop of an image-capturing lens, and the photoelectric conversion areas that correspond to the single micro-lens are provided as four areas that are arranged in an array with two longitudinal areas and two lateral areas or as nine areas that are arranged in an array with three longitudinal areas and three lateral areas. However, the number n of the optical areas or the photoelectric conversion areas is not limited to four or nine. For example, the optical area provided in the stop may be divided into 4 longitudinal optical areas and 4 lateral optical areas to form 16 optical areas. In response to that, the group of the pixels that corresponds to the single micro-lens may be configured with 16 pixels in an array with 4 longitudinal pixels and 4 lateral pixels. In this case, matrix G that expresses the crosstalk amounts becomes a matrix of 16 rows and 16 columns, and the crosstalk may be corrected by computation of the inverse matrix thereof, similarly. In order to obtain coefficients of the crosstalk matrix in this case, images are captured in a state where only one of the 16 optical areas is opened and the others are shielded, and average luminance values of individual images that are obtained by image rearrangement may be used. This process is performed for all 16 openings, and 256 coefficients of a matrix of 16 rows and 16 columns may thereby be obtained. Further, in a case where symmetry is secured by arrangement of the element, the 256 coefficients contain plural same values. Thus, similarly to the above embodiments, measurements of the coefficients or the like may be simplified.

Further, in a case where the number of division of the pixels that correspond to the single micro-lens is further increased, for example, division into four longitudinal pixels and four lateral pixels, five longitudinal pixels and five lateral pixels, and so forth, it is possible to perform a similar process. Further, the number of longitudinal pixels may be different from the number of lateral pixels in the pixels that correspond to the single micro-lens.

Figure 15A:
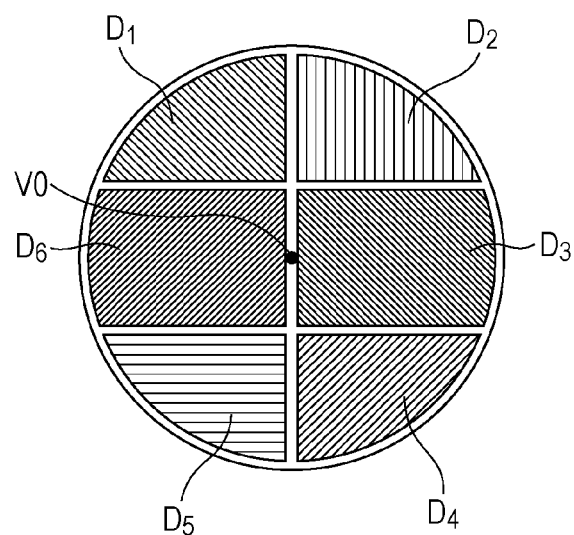
FIG. 15A is a diagram illustrating an example of an array of six optical areas.
Figure 15B:
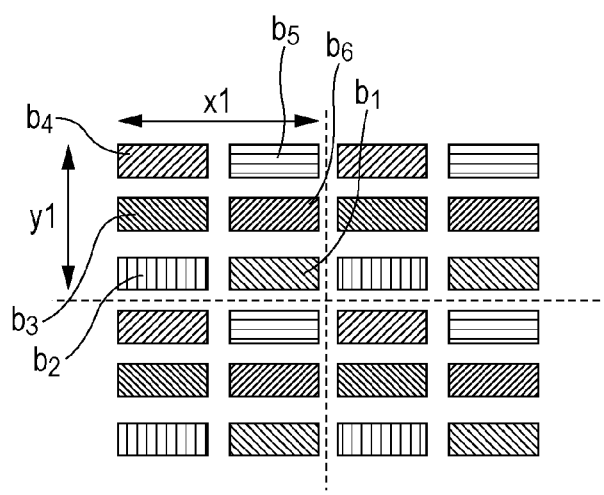
FIG. 15B is a diagram illustrating arrangement of six pixels in one corresponding group.

For example, as illustrated in FIG. 15A, the number n may be set to six, and the optical areas may be arrayed with two lateral optical areas (horizontal direction) and three longitudinal optical areas (vertical direction). In this case, in a case where a cross section of an optical path that is orthogonal to the optical axis V0 of the optical lens system L is circular, as illustrated in FIG. 15B, pixels $b_1$, $b_2$, $b_3$, $b_4$, $b_5$, and $b_6$ that configure each group of the image sensor are arrayed with two lateral pixels (horizontal direction) and three longitudinal pixels (vertical direction). Further, shapes of the pixels may be adjusted such that a lateral length x1 and a longitudinal length y1 are almost equivalent in each of the groups. In this case, the crosstalk matrix becomes a matrix of six rows and six columns, and a similar method to the one described in the present disclosure enables correction of the crosstalk and obtainment of the coefficients of the crosstalk matrix.

Further, in a case where the number of pixels that correspond to the single micro-lens is two, a similar device to the present disclosure may be realized by using a lenticular lens instead of the micro-lens.

Further, in a case where computation of the above-described matrix that expresses the crosstalk amounts and the inverse matrix is performed by an external processor other than the imaging apparatus, for example, a personal computer, the imaging apparatus may include a data input device to cause the memory to store the inverse matrix obtained by the external processor.

An imaging apparatus disclosed in the present disclosure is usable for various fields in which an image of an object or the like is captured and an image is thereby obtained and is preferably used for an image measurement, machine vision, remote sensing, a surveillance camera, an in-vehicle camera, and so forth, for example.

What is claimed is:

1. An imaging apparatus comprising:
an optical system that consists of n optical areas (n being an integer of 2 or greater) that are arranged approximately orthogonally to an optical axis;
an image sensor that has plural groups formed of n pixels and that converts light incident on the pixels into pixel signals by photoelectric conversion;
an optical element array positioned between the optical system and the image sensor and in which plural optical components are arranged, the optical components cause light that passes through the n optical areas to be incident on the n pixels in the group that correspond to the optical areas;
a memory that stores a group of coefficients configured with a matrix consisting of n rows and n columns in which elements are expressed by $R_{ik}$ (i and k being integers that satisfy $1 \leq i \leq n$ and $1 \leq k \leq n$); and
a processor that receives the group of coefficients from the memory and calculates n converted pixel signals $x'_1$, $x'_2, \ldots, x'_n$ from n pixel signals $x_1, x_2, \ldots, x_n$ obtained from each of the groups of the image sensor by the following equation $$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R{n,n} \end{pmatrix} \begin{pmatrix} x_1 \\ x_2 \\ \vdots \\ x_n \end{pmatrix}.$$

2. The imaging apparatus according to claim 1, wherein the processor generates n image signals from the converted pixel signals $x'_1, x'_2, \ldots, x'_n$ of each of the groups.

3. The imaging apparatus according to claim 1, wherein the optical element array is a micro-lens array and is integrally formed on the image sensor.

4. The imaging apparatus according to claim 1, wherein no color filter is provided between the optical element array and a photoelectric conversion area of the image sensor.

5. The imaging apparatus according to claim 1, wherein at least one of the n optical areas is different from the other optical areas in at least one selected from the group consisting of a polarization characteristic of the light that passes through the optical area, a spectral wavelength characteristic of the light that passes through the optical area, a transmittance of the light that passes through the optical area, and an area in a plane that is orthogonal to the optical axis of the optical areas.

6. The imaging apparatus according to claim 1, wherein differences among light intensities of light incident on the n pixels are less than 2% in each of the groups of the image sensor.

7. The imaging apparatus according to claim 1, wherein given that a proportion in which a light beam that passes through any one of the n optical areas is caused to be incident on a normal pixel in a design by the corresponding optical component of the optical element array in each of the groups of the image sensor is α%, a proportion in which the light beam is caused to be incident on one neighboring pixel is β%, and a proportion in which the light beam is caused to be incident on one obliquely neighboring pixel is δ%,
α, β, and δ satisfy relationships of
α>β>δ, and
β<25%.

8. The imaging apparatus according to claim 7, wherein α and β satisfy a relationship of
α>4β.

9. The imaging apparatus according to claim 7, wherein α satisfies a relationship of
85%>α>65%.

10. The imaging apparatus according to claim 1, further comprising:
a data input device that inputs at least some coefficient values of the group of coefficients.

11. The imaging apparatus according to claim 1, wherein the processor calculates crosstalk amounts due to the optical components and calculates a matrix that expresses the calculated crosstalk amounts and an inverse matrix of the matrix, and
the memory stores the inverse matrix as the group of coefficients.

12. An imaging apparatus comprising:
an optical system that has n optical areas (n being an integer of 2 or greater) that are arranged approximately orthogonally to an optical axis;
an image sensor that has plural groups formed of n pixels and that converts light incident on the pixels into pixel signals by photoelectric conversion;
an optical element array positioned between the optical system and the image sensor and in which plural optical components are arranged, the optical components cause light that passes through the n optical areas to be incident on the n pixels in the group that correspond to the optical areas;
a memory that stores a group of coefficients configured with a matrix of n rows and n columns in which elements are expressed by $R_{ik}$ (i and k being integers that satisfy $1 \leq i \leq n$ and $1 \leq k \leq n$); and
a processor that receives the group of coefficients from the memory and calculates n converted pixel signals $x'_1, x'_2, \ldots, x'_n$ from n pixel signals $x_1, x_2, \ldots, x_n$ obtained from each of the groups of the image sensor by the following equation, $$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R_{n,n} \end{pmatrix} \begin{pmatrix} x_1 \\ x_2 \\ \vdots \\ x_n \end{pmatrix}$$

wherein
n satisfies a relationship of
n=m×m (m being an integer of 2 or greater),
n pixels are arranged in m rows and m columns in a horizontal direction and in a vertical direction in each of the groups of the image sensor, and
the optical components of the optical element array cause light that passes through the n optical areas to be incident on the pixels arranged in the m rows and the m columns.

13. The imaging apparatus according to claim 12, wherein n is 4 and m is 2, and
the group of coefficients is the following matrix configured with four numbers ε, η, θ, and λ that satisfy the following conditions:
ε>1;
θ<0;
η<0;
ε>λ;
λ>θ; and
λ>η.

$$G_m^{-1} = \begin{pmatrix} \varepsilon & \eta & \theta & \lambda \\ \eta & \varepsilon & \lambda & \theta \\ \theta & \lambda & \varepsilon & \eta \\ \lambda & \theta & \eta & \varepsilon \end{pmatrix}.$$

14. The imaging apparatus according to claim 13, wherein ε satisfies a relationship of 1<ε<2.

15. The imaging apparatus according to claim 13, wherein λ satisfies a relationship of −0.3<λ<0.

16. The imaging apparatus according to claim 12, wherein n is 4 and m is 2, and
the group of coefficients is the following matrix configured with three numbers ε, η, and λ that satisfy the following conditions:
ε>λ>η;
ε>1; and
η<0

$$G_s^{-1} = \begin{pmatrix} \varepsilon & \eta & \eta & \lambda \\ \eta & \varepsilon & \lambda & \eta \\ \eta & \lambda & \varepsilon & \eta \\ \lambda & \eta & \eta & \varepsilon \end{pmatrix}.$$

17. The imaging apparatus according to claim 12, wherein diagonal components $R_{ii}$ (i being an integer that satisfies $1 \leq i \leq n$) of the matrix that configures the group of coefficients satisfies a relationship of 1<$R_{ii}$<2.3.

18. An imaging apparatus comprising:
an optical system that has n optical areas (n being an integer of 2 or greater) that are arranged approximately orthogonally to an optical axis;
an image sensor that has plural groups formed of n pixels and that converts light incident on the pixels into pixel signals by photoelectric conversion;
an optical element array positioned between the optical system and the image sensor and in which plural optical components are arranged, the optical components cause light that passes through the n optical areas to be incident on the n pixels in the group that correspond to the optical areas;

a memory that stores a group of coefficients configured with a matrix of n rows and n columns in which elements are expressed by $R_{ik}$ (i and k being integers that satisfy $1 \leq i \leq n$ and $1 \leq k \leq n$); and a processor that receives the group of coefficients from the memory and calculates n converted pixel signals $x'_1, x'_2, \ldots, x'_n$ from n pixel signals $x_1, x_2, \ldots, x_n$ obtained from each of the groups of the image sensor by the following equation, $$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R_{n,n} \end{pmatrix} \begin{pmatrix} x_1 \\ x_2 \\ \vdots \\ x_n \end{pmatrix}$$

wherein given that a proportion in which a light beam that passes through any one of the n optical areas is caused to be incident on a normal pixel in a design by the corresponding optical component of the optical element array in each of the groups of the image sensor is $\alpha\%$, a proportion in which the light beam is caused to be incident on one neighboring pixel is $\beta\%$, and a proportion in which the light beam is caused to be incident on one obliquely neighboring pixel is $\delta\%$, $\alpha$, $\beta$, and $\delta$ satisfy relationships of $\alpha > \beta > \delta$, and $\beta < 25\%$, wherein $\beta$ is approximately twice as great as $\delta$.

19. An imaging apparatus comprising:

an optical system that has n optical areas (n being an integer of 2 or greater) that are arranged approximately orthogonally to an optical axis;

an image sensor that has plural groups formed of n pixels and that converts light incident on the pixels into pixel signals by photoelectric conversion;

an optical element array positioned between the optical system and the image sensor and in which plural optical components are arranged, the optical components cause light that passes through the n optical areas to be incident on the n pixels in the group that correspond to the optical areas;

a memory that stores a group of coefficients configured with a matrix of n rows and n columns in which elements are expressed by $R_{ik}$ (i and k being integers that satisfy $1 \leq i \leq n$ and $1 \leq k \leq n$); and a processor that receives the group of coefficients from the memory and calculates n converted pixel signals $x'_1, x'_2, \ldots, x'_n$ from n pixel signals $x_1, x_2, \ldots, x_n$ obtained from each of the groups of the image sensor by the following equation, $$\begin{pmatrix} x'_1 \\ x'_2 \\ \vdots \\ x'_n \end{pmatrix} = \begin{pmatrix} R_{1,1} & R_{1,2} & \ldots & R_{1,n} \\ R_{2,1} & R_{2,2} & \ldots & R_{2,n} \\ \vdots & \vdots & \ddots & \vdots \\ R_{n,1} & R_{n,2} & \ldots & R_{n,n} \end{pmatrix} \begin{pmatrix} x_1 \\ x_2 \\ \vdots \\ x_n \end{pmatrix}$$

wherein the processor generates n image signals from the converted pixel signals $x'_1, x'_2, \ldots, x'_n$ of each of the groups, the imaging apparatus further comprising: a light-shielding member that causes light to pass through one optical area among the n optical areas of the optical system and shields the other optical areas from light, wherein the processor captures an image of an object by using the light-shielding member to calculate the group of coefficients from the n pixel signals $x_1, x_2, \ldots, x_n$ obtained from each of the groups of the image sensor or to calculate the group of coefficients from the n image signals, and the memory stores the calculated group of coefficients.

20. The imaging apparatus according to claim 19, wherein the light-shielding member is capable of changing the one optical area that causes light to pass through, and the processor performs plural image captures while changing the one optical area that causes light to pass through and calculates the group of coefficients based on the plural image captures.

* * * * *